US012092976B2

(12) United States Patent
Ota

(10) Patent No.: US 12,092,976 B2
(45) Date of Patent: Sep. 17, 2024

(54) FIXING DEVICE AND IMAGE FORMING APPARATUS WITH TEMPERATURE SENSOR AND CONTROLLER

(71) Applicant: Toshiba Tec Kabushiki Kaisha, Tokyo (JP)

(72) Inventor: Hiroshi Ota, Ota Tokyo (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/159,596

(22) Filed: Jan. 25, 2023

(65) Prior Publication Data

US 2024/0248425 A1 Jul. 25, 2024

(51) Int. Cl.

*G03G 15/20* (2006.01)
*G03G 15/00* (2006.01)
*H05B 3/00* (2006.01)
*H05B 47/00* (2020.01)
*H05B 47/28* (2020.01)

(52) U.S. Cl.

CPC ....... *G03G 15/205* (2013.01); *G03G 15/2042* (2013.01); *G03G 15/55* (2013.01); *H05B 3/0066* (2013.01); *H05B 47/28* (2020.01)

(58) Field of Classification Search

CPC ............. G03G 15/205; G03G 15/2042; G03G 15/2039; G03G 15/5004; G03G 15/55; H05B 1/0241; H05B 3/0066; H05B 47/28

USPC ................................ 399/33, 69, 88; 219/216

See application file for complete search history.

(56) References Cited

U.S. PATENT DOCUMENTS

| | | | | |
|---|---|---|---|---|
| 8,027,600 B2 * | 9/2011 | Yoneda | .............. | G03G 15/2039 399/33 |
| 8,886,064 B2 * | 11/2014 | Fujimoto | ............. | G03G 15/205 399/33 |
| 2006/0056866 A1 * | 3/2006 | Oka | .................. | G03G 15/2042 399/33 |
| 2011/0095691 A1 * | 4/2011 | Nakajo | .................. | H05B 47/20 315/133 |
| 2015/0063852 A1 * | 3/2015 | Ota | .................... | G03G 15/2039 399/69 |
| 2021/0081733 A1 | 3/2021 | Hitaka | | |
| 2021/0132529 A1 | 5/2021 | Kataoka | | |

(Continued)

FOREIGN PATENT DOCUMENTS

| | | | | |
|---|---|---|---|---|
| JP | 2004317929 A | | 11/2004 | |
| JP | 2006201780 A | * | 8/2006 | ......... G03G 15/2042 |
| JP | 2006243288 A | | 9/2006 | |

(Continued)

*Primary Examiner* — Robert B Beatty

(74) *Attorney, Agent, or Firm* — Kim & Stewart LLP

(57) ABSTRACT

According to one embodiment, a fixing device includes a fixing member, a temperature sensor unit, a heater unit, and a controller. The fixing member has a surface that contacts a sheet. The temperature sensor unit is configured to measure a temperature of the surface of the fixing member. The heater unit is configured to heat the member when turned ON. The controller is configured to output a notification indicating an abnormality in the temperature measurement by the temperature sensor unit if an ON time of the heater unit during an operation period for controlling the fixing member to be at a target temperature, as measured by the temperature sensor unit, is longer than a predetermined threshold time.

18 Claims, 15 Drawing Sheets

(56) References Cited

U.S. PATENT DOCUMENTS

2022/0035290 A1 2/2022 Matsumura

FOREIGN PATENT DOCUMENTS

| | | | |
|---|---|---|---|
| JP | 2008102413 | A | 5/2008 |
| JP | 2008310086 | A | 12/2008 |
| JP | 2012047775 | A | 3/2012 |
| JP | 2012198271 | A | 10/2012 |
| JP | 2014164149 | A | 9/2014 |
| JP | 2015158634 | A | 9/2015 |
| JP | 2018017885 | A | 2/2018 |
| JP | 2021189339 | A | 12/2021 |
| KR | 10-0353653 | B1 * | 1/2003 |

* cited by examiner

FIG. 11

| ON TIME DIFFERENCE t (sec) | ACTUAL TEMPERATURE INCREMENT |
|---|---|
| $10 \leq t$ | CENTER +30°C |
| $6 \leq t < 10$ | CENTER +20°C |
| $2 \leq t < 6$ | CENTER +10°C |
| $2 > t > -9$ | NORMAL RANGE |
| $-9 \geq t > -14$ | SIDE +10°C |
| $-14 \geq t$ | SIDE +20°C |

FIXING DEVICE AND IMAGE FORMING APPARATUS WITH TEMPERATURE SENSOR AND CONTROLLER

FIELD

Embodiments described herein relate generally to a fixing device and an image forming apparatus that incorporates a fixing device.

BACKGROUND

An image forming apparatus placed in a workplace, office, or the like may include a fixer (fixing device) that fixes a toner image to a print medium (e.g., a sheet of paper) with heat and pressure. The fixer has a temperature sensor that detects the surface temperature of a rotating body using in the fixing. The fixer controls the surface temperature of the rotating body to be a target value based on a detection signal from the temperature sensor.

However, the temperature sensor may become incapable of accurate temperature sensing due to dirt adhesion/accumulation or the like. If the temperature sensor is incapable of accurate temperature sensing, there is a problem that a controller may control the surface temperature of the rotating body to be a temperature different from the intended target value.

BRIEF DESCRIPTION OF THE DRAWINGS

FIG. 11 is a table summarizing results of actual temperature increment (offset) determination for ON time differences illustrated in FIG. 10.

DETAILED DESCRIPTION

In general, according to an embodiment, a fixing device includes a fixing member, a temperature sensor unit, a heater unit, and a controller. The fixing member has a surface that contacts a sheet. The temperature sensor unit is configured to measure a temperature of the surface of the fixing member. The heater unit is configured to heat the fixing member when turned ON. The controller is configured to output a notification indicating an abnormality in the temperature measurement by the temperature sensor unit if an ON time of the heater unit during an operation period for controlling the fixing member to be at a target temperature, as measured by the temperature sensor unit, is longer than a predetermined threshold time.

An image forming apparatus according to certain example embodiments will be described below with reference to the drawings.

Figure 1:
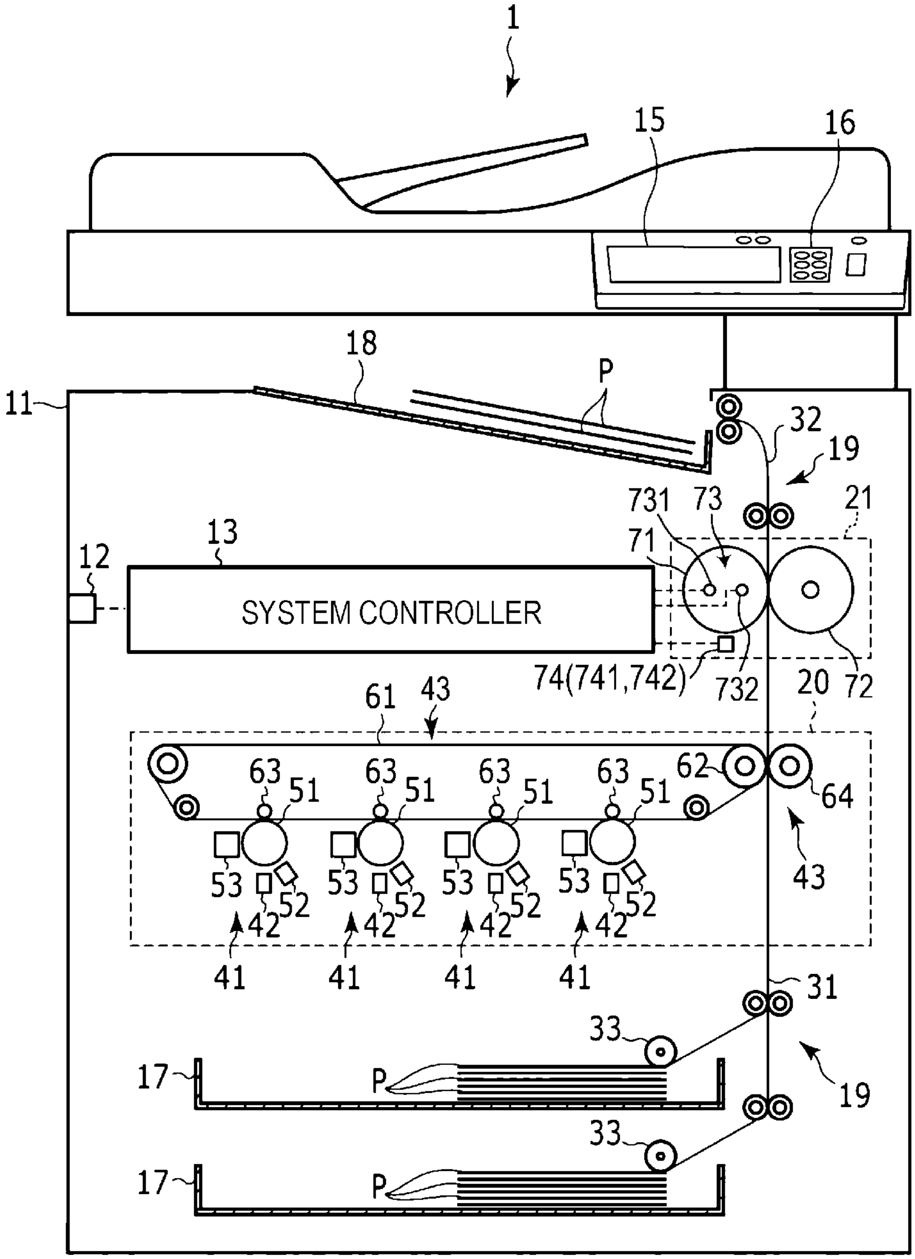
FIG. 1 is a diagram of an image forming apparatus including a fixer according to an embodiment.

FIG. 1 is a diagram for describing a configuration example of an image forming apparatus 1 according to an embodiment.

The image forming apparatus 1 is, for example, a digital multifunction peripheral (MFP) that performs various types of processing, such as image formation, while conveying a recording medium such as a sheet or paper or the like. The image forming apparatus 1 toner transfers a image formed by electrophotography onto a print medium (sheet) and then fixes the toner image to the print medium with a fixer.

The image forming apparatus 1 receives toner from a toner cartridge and prints an image on the print medium using the received toner. The toner may be a single-color toner or a color toner such as cyan, magenta, yellow, and black toners. In addition, the toner may be decolorable toner that can be decolored if heat is applied.

As illustrated in FIG. 1, the image forming apparatus 1 includes a housing 11, a communication interface 12, a system controller 13, a display device 15, an operation device 16, a plurality of paper trays 17, a paper discharge tray 18, a conveyance mechanism 19, an image forming mechanism 20, and a fixer 21.

The housing 11 is the main body of the image forming apparatus 1. The housing 11 accommodates the communication interface 12, the system controller 13, the display device 15, the operation device 16, the plurality of paper trays 17, the paper discharge tray 18, the conveyance mechanism 19, the image forming mechanism 20, and the fixer 21.

The communication interface 12 is an interface for communicating with another device connected through a network. The communication interface 12 is used for communication with an external device. The external device may be a user terminal that instructs a print job, a print server (an external management device), or the like. The communication interface 12 is, for example, a LAN connector or the like. The communication interface 12 may perform wireless communication with another device in accordance with standards such as Bluetooth® and/or Wi-fi.

The system controller 13 (hereinafter, referred to as the controller 13) executes control over each sub-component of the image forming apparatus 1, performs data processing, and so on. For example, the controller 13 is a computer including a processor, a memory, and various interfaces. The controller 13 controls each sub-component and performs the necessary data processing by executing a program on the processor. Such a program may be stored in the memory of the controller 13. The controller 13 is connected to each sub-component in the housing 11 by various internal interfaces and/or connectors.

The controller 13 acquires a print job including, for example, image data received from an external device via the communication interface 12. The image data included in the print job is data representing an image to be formed on a print medium P. The image data may be data for image formation on one print medium P (single sheet) or may be data for image formation on a plurality of the print media P (multiple sheets). In addition, the print job may include printing condition-indicating information (print parameters) such as information selecting color printing or monochrome printing.

The controller 13 includes an engine controller that controls the operations of the conveyance mechanism 19, the image forming mechanism 20, and the fixer 21. For example, the controller 13 controls the conveyance of the print medium P by control of the conveyance mechanism 19. The controller 13 controls developer image formation by control of the image forming mechanism 20 and then developer image transfer to the print medium P. The controller 13 controls developer image fixing onto the print medium P by control of the fixer 21. That is, the controller 13 forms an image corresponding to the image data included in the print job on the print medium P by controlling the operations of the conveyance mechanism 19, the image forming mechanism 20, and the fixer 21.

It should be noted that the image forming apparatus 1 may be configured in some examples to have an engine controller separate from the controller 13. For example, the image forming apparatus 1 may be provided with an engine controller that directly controls at least one of the conveyance mechanism 19, the image forming mechanism 20, the fixer 21, and on the like. Such an engine controller provided separately from the controller 13 may acquire information necessary for control from the controller 13 and be controlled overall by the controller 13.

The display device 15 includes a display that displays an image in accordance with an image signal input from a display control unit such as the system controller 13 and/or a graphic controller. For example, the display device 15 displays a setting screen for setting/adjusting various possible settings of the image forming apparatus 1 on the display.

The operation device 16 supplies the system controller 13 with an operation signal corresponding to the user input operation made via the operation device 16. The operation device 16 is, for example, a touch sensor, a numeric keypad, a power key, various function keys, a keyboard, or the like. The touch sensor acquires information indicating a specified position that has been touched in a certain region. The touch sensor may be integrated with the display device 15 as a touch panel. The display device 15 and the operation device 16 may be provided as an operation panel for a user interface in some examples.

Next, the configuration of the conveyance system in the image forming apparatus 1 will be described.

Each of the paper trays 17 is a cassette that accommodates a print medium P. The paper tray 17 are configured such that the print medium P can be supplied from the outside of the housing 11. For example, the paper tray 17 is configured such that the paper tray 17 can be pulled out from the housing 11 for access.

The paper discharge tray 18 supports the print medium P discharged from the image forming apparatus 1.

The conveyance mechanism 19 conveys the print medium P in the image forming apparatus 1. As illustrated in FIG. 1, the conveyance mechanism 19 includes a plurality of conveyance paths. For example, the conveyance mechanism 19 includes a paper feed conveyance path 31 and a paper discharge conveyance path 32.

Each of the paper feed conveyance path 31 and the paper discharge conveyance path 32 is comprises motors, rollers, and guides. The motors rotate the rollers based on the control of the system controller 13. The rollers move the print medium P along the conveyance path when rotated by a motor. The guides control the conveyance direction of the print medium P to keep the print medium on the appropriate conveyance path.

The paper feed conveyance path 31 takes in the print medium P from a paper tray 17 and supplies the taken-in print medium P to the image forming mechanism 20. The paper feed conveyance path 31 includes a pickup roller 33 for each paper tray. By each pickup roller 33, the print medium P in a paper tray 17 can be taken onto the paper feed conveyance path 31.

The paper discharge conveyance path 32 is for discharging the print medium P to the outside of the housing 11 after an image has been formed (printed) on the print medium P. The print medium P discharged by the paper discharge conveyance path 32 then rests on the paper discharge tray 18.

Next, the configuration of the image forming mechanism 20 in the image forming apparatus 1 will be described.

The image forming mechanism 20 forms an image on a print medium P. The image forming mechanism 20 forms an image on the print medium P based on the print job generated by the controller 13.

The image forming mechanism 20 includes a plurality of process units 41 (image forming stations), a plurality of exposure units 42, and a transfer mechanism 43. The image forming mechanism 20 includes an exposure unit 42 for each process unit 41. Each of the plurality of process units 41 and exposure units 42 may have substantially the same configuration, and thus one process unit 41 and one exposure unit 42 will be described as representative examples of the rest.

The process unit 41 forms a toner image. For example, a process unit 41 is provided for each type of toner used by the image forming apparatus 1. For example, the plurality of process units 41 respectively correspond to color toners such as cyan, magenta, yellow, and black. Specifically, a toner cartridge having toner of a different color is connected to each process unit 41.

The toner cartridge includes a toner accommodation container and a toner delivery mechanism. The toner accommodation container is stores toner to be used. The toner delivery mechanism is a mechanism is, for example, a screw delivering the toner from the toner accommodation container to the process unit 41.

The process unit 41 includes a photoreceptor drum 51, a charger 52, and a developer device 53.

The photoreceptor drum 51 is a cylindrical drum with a photosensitive layer formed on the outer peripheral surface of the drum. The photoreceptor drum 51 is rotated at a constant speed by a drive mechanism.

The charging charger 52 uniformly charges the surface of the photoreceptor drum 51. For example, by applying a voltage (development bias voltage) to the photoreceptor drum 51 using a charging roller, the charging charger 52 charges the photoreceptor drum 51 to a uniform negative potential (contrast potential). The charging roller is rotated by the rotation of the photoreceptor drum 51 with a predetermined pressure applied to the photoreceptor drum 51.

The developer device 53 causes toner to adhere to the photoreceptor drum 51. The developer device 53 includes a developer container, a stirring mechanism, a developing roller, a doctor blade, and an automatic toner control (ATC) sensor.

The developer container is a container that receives and accommodates the toner delivered from the toner cartridge. A carrier is pre-accommodated in the developer container. The toner delivered from the toner cartridge is stirred (mixed) with the carrier by the stirring mechanism to form a developer in which the particles of toner and the carrier are mixed. The carrier is accommodated in the developer container when the developer device 53 is manufactured.

The developing roller causes the developer to adhere to its surface by rotating in the developer container. The doctor blade is a member that is disposed at a predetermined interval from the surface of the developing roller. The doctor blade partially removes the developer that adheres to the surface of the rotating developing roller. As a result, a developer layer with a thickness corresponding to the interval between the doctor blade and the surface of the developing roller is formed on the surface of the developing roller.

The ATC sensor is, for example, a magnetic flux sensor that has a coil and detects the value of the voltage generated in the coil. The voltage detected by the ATC sensor varies with the density of the magnetic flux from the toner in the developer container which varies with the amount of toner in the developer container. The system controller 13 determines the concentration ratio (toner concentration ratio) of the toner to the carrier in the developer container based on the voltage detected by the ATC sensor. Based on the toner concentration ratio, the system controller 13 operates a motor that drives the delivery mechanism of the toner cartridge to deliver additional toner from the toner cartridge to the developer container of the developer device 53.

The exposure unit 42 has a plurality of light emitting elements. The exposure unit 42 forms a latent image on the photoreceptor drum 51 by irradiating the charged photoreceptor drum 51 with light from the light emitting element(s). The light emitting element is, for example, a light emitting diode (LED) or the like. One light emitting element may be configured to emit light to one position on the photoreceptor drum 51. The plurality of light emitting elements are arranged along a main scanning direction, which is parallel to the axis of rotation of the photoreceptor drum 51.

The exposure unit 42 forms a latent image for one line of the image data on the photoreceptor drum 51 by emitting light onto the photoreceptor drum 51 selectively from the plurality of light emitting elements arranged along the main scanning direction. The exposure unit 42 forms the latent image comprising a plurality of lines by irradiating the rotating photoreceptor drum 51 with light in a manner corresponding to a line-by-line process.

In the above configuration, an electrostatic latent image is formed when the surface of the photoreceptor drum 51 that has been charged by the charging charger 52 is selectively irradiated with light from the exposure unit 42. When the developer layer formed on the surface of the developing roller comes close to the surface of the photoreceptor drum 51, the toner in the developer adheres to the latent image on the surface of the photoreceptor drum 51. As a result, a toner image is formed on the surface of the photoreceptor drum 51.

The transfer mechanism 43 is configured to transfer the toner image on the surface of the photoreceptor drum 51 to the print medium P. The transfer mechanism 43 transfers the toner image from the surface of the photoreceptor drum 51 onto a primary transfer belt 61 and then transfers the toner image from the primary transfer belt 61 onto the print medium P.

The transfer mechanism 43 includes, for example, the primary transfer belt 61, a secondary transfer facing roller 62, a plurality of primary transfer rollers 63, and a secondary transfer roller 64.

In the configuration example illustrated in FIG. 1, the primary transfer belt 61 is an endless belt wound around the secondary transfer facing roller 62 and a plurality of winding rollers. The primary transfer belt 61 has an inside surface (inner peripheral surface) in contact with the secondary transfer facing roller 62 and the plurality of winding rollers and an outside surface (outer peripheral surface) facing the photoreceptor drum 51 of the process unit 41.

The secondary transfer facing roller 62 is rotated by a motor. The secondary transfer facing roller 62 rotates to convey the primary transfer belt 61 in a predetermined conveyance direction. The plurality of winding rollers are configured to be freely rotatable (they are not motor driven rollers). The plurality of winding rollers rotate as the primary transfer belt 61 is driven by the secondary transfer facing roller 62.

The plurality of primary transfer rollers 63 are configured to bring the primary transfer belt 61 into contact with the photoreceptor drum 51 of each process unit 41. The plurality of primary transfer rollers 63 are provided so as to correspond one-to-one to the photoreceptor drums 51 of the plurality of process units 41. Specifically, the plurality of primary transfer rollers 63 are provided at positions (primary transfer positions) facing the photoreceptor drums 51 of the respectively corresponding process units 41 with the primary transfer belt 61 interposed therebetween. The primary transfer roller 63 comes into contact with the inner peripheral surface side of the primary transfer belt 61 and displaces the primary transfer belt 61 to the photoreceptor drum 51 side. As a result, the primary transfer roller 63 brings the outer peripheral surface of the primary transfer belt 61 contact into with the photoreceptor drum 51.

The secondary transfer roller 64 is provided at a position (secondary transfer position) facing the primary transfer belt 61. The secondary transfer roller 64 comes into contact with, and applies pressure to, the outer peripheral surface of the primary transfer belt 61. As a result, a transfer nip where the secondary transfer roller 64 and the outer peripheral surface of the primary transfer belt 61 are in close contact with each other is formed. When the print medium P passes through the transfer nip, the secondary transfer roller 64 presses the passing print medium P against the outer peripheral surface of the primary transfer belt 61.

The secondary transfer roller 64 and the secondary transfer facing roller 62 rotate to convey the print medium P. As a result, the print medium P passes through the transfer nip.

In the above configuration, when the outer peripheral surface of the primary transfer belt 61 comes into contact with the photoreceptor drum 51, the toner image formed on the surface of the photosensitive drum is transferred to the outer peripheral surface of the primary transfer belt 61. When the image forming mechanism 20 includes a plurality of process units 41, the primary transfer belt 61 receives separate toner images from each of the photoreceptor drums 51 of the plurality of process units 41. The toner images transferred to the outer peripheral surface of the primary transfer belt 61 are conveyed by the primary transfer belt 61 to the transfer nip (where the secondary transfer roller 64 and the outer peripheral surface of the primary transfer belt 61 are in close contact with each other). If the print medium P is present at the transfer nip, the toner image transferred to the outer peripheral surface of the primary transfer belt 61 is transferred to the print medium P at the transfer nip.

Next, the configuration of the fixer 21 (fixing device) in the image forming apparatus 1 will be described.

The fixer 21 fixes the toner image onto the print medium P. The fixer 21 operates based on the control of the system controller 13. A fixing device according to the present embodiment can be a device that incorporates the fixer 21 and the system controller 13 for controlling the fixer 21. The fixer 21 includes a fixing rotating body (also referred to as a fixing member), a pressing member, a heating member (also referred to as a heat source), and a temperature sensor. Although various configurations can be utilized for the fixer 21, a first configuration example of the fixer 21 is illustrated in FIG. 1.

In the configuration example illustrated in FIG. 1, a heat roller 71 is an example of the fixing rotating body (fixing member). In addition, a press roller 72 is an example of the pressing member. A heater unit 73 is an example of the heating member (or heat source). The fixer 21 according to this embodiment includes a heater unit 73 incorporating a plurality of heat sources. In the configuration example illustrated in FIG. 1, the heater unit 73 has a heater 731 (center heater 731) as an example of a first heat source and a heater 732 (side heater 732) as an example of a second heat source. A temperature sensor unit 74 detects the temperature of a surface of the heat roller 71. The fixer 21 according to this embodiment has a plurality of temperature sensors in the temperature sensor unit 74. In some examples, the temperature sensor unit 74 may have only a single temperature sensor. In the configuration example illustrated in FIG. 1, the temperature sensor unit 74 has a temperature sensor 741 (center temperature sensor 741) and a temperature sensor 742 (side temperature sensor 742).

Figure 2:
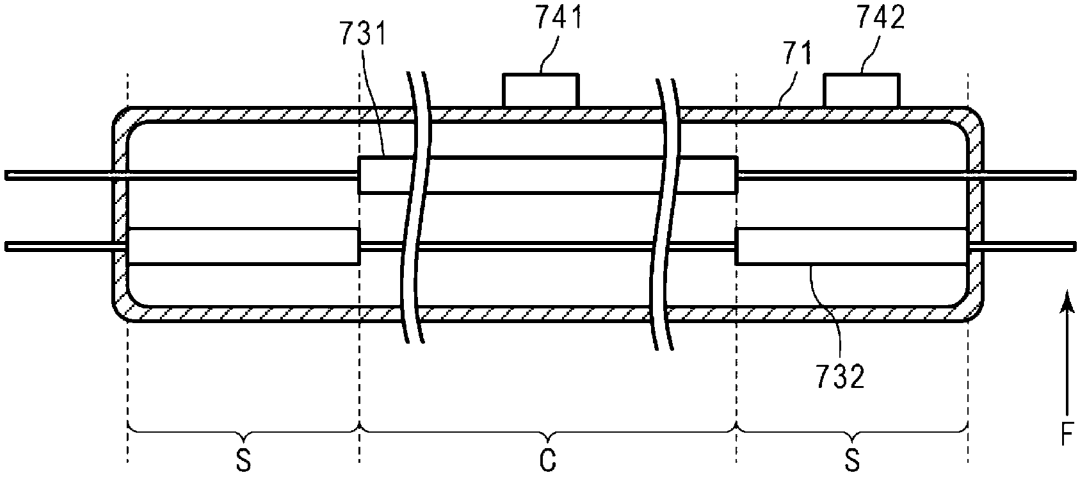
FIG. 2 is a diagram illustrating a first configuration example of a fixer.

FIG. 2 is a cross-sectional view illustrating a configuration example around the heat roller 71 in the fixer 21 of the first configuration example illustrated in FIG. 1.

The heat roller 71 is a fixing rotating body that rotates while being heated by the heater unit 73. The heat roller 71 has a hollow core metal formed of metal and an elastic layer formed on the outer periphery of the core metal.

The diameter of the heat roller 71 is, for example, @30 mm. The core metal is aluminum with a thickness of, for example, 0.6 mm. The peripheral speed of the heat roller 71 is, for example, 210 mm/s. The elastic layer is, for example, fluororesin (tetrafluoroethylene resin). The diameter of the heat roller 71, the core metal thickness, the peripheral speed value, and the materials of the core metal and the elastic layer described above are non-limiting examples.

As for the heat roller 71, the inside of the core metal is heated by the heater unit 73 (heat source) disposed inside the hollow core metal. The heat applied to the inside of the core metal is transferred to the surface of the heat roller 71 (that is, the surface of the elastic layer) outside the core metal. The fixing rotating body may be configured as an endless belt in some examples.

The press roller 72 is provided at a position facing the heat roller 71. The press roller 72 has a core metal formed of metal with a predetermined outer diameter and an elastic layer formed on the outer periphery of the core metal. The diameter of the press roller 72 is, for example, φ30 mm. The elastic layer press roller 72 is, for example, silicone rubber or fluororubber.

The press roller 72 applies pressure to the heat roller 71 with force applied from a tension member. The pressure is, for example, 150 N. The diameter, pressure value, and materials of the press roller 72 are non-limiting examples. By applying pressure from the press roller 72 to the heat roller 71, a nip (fixing nip) where the press roller 72 and the heat roller 71 are in close contact with each other is formed. The press roller 72 is rotated by a motor. The press roller 72 rotates to move the print medium P that enters the fixing nip and presses the print medium P against the heat roller 71. Each of the heat roller 71 and the press roller 72 may have a release layer on the surface thereof.

The heater unit 73 comprises heating elements (a plurality of heat sources) that emit heat when being supplied with electric power from the system controller 13. The heater unit 73 in the fixer 21 of the first configuration example illustrated in FIGS. 1 and 2 has the center heater 731 and the side heater 732 as two separately controllable heat sources (heating elements). The center heater 731 and the side heater 732 can be, for example, halogen lamp heaters including halogen lamps.

The center heater 731 heats the middle portion (center region C) of the heat roller 71. The side heater 732 heats the peripheral portions (side regions S) of the heat roller 71 outside the middle portion. The print medium P is conveyed in the conveyance direction F illustrated in FIG. 2. For example, size and positioning of the center region C and the side region(s) S may be set in accordance with the expected sizes (e.g., different standard paper sheet widths) of a medium that is to be used as the print medium P in the image forming apparatus 1.

Both the center heater 731 and the side heater 732 generate heat by being supplied electric power under the control of the system controller 13. The power consumption of the center heater 731 and the side heater 732 is, for example, 600 W.

In general, the controller 13 heats only the middle portion of the heat roller 71 when fixing processing is to be executed on a print medium P that is narrow along the rotation axis direction of the heat roller 71 (conveyance direction F of the print medium P). When the middle portion of the heat roller 71 is heated, the controller 13 can energize the center heater 731 without energizing the side heater 732.

If fixing processing is to be executed on a print medium P that is wide in the rotation axis direction of the heat roller 71, the controller 13 can heat the middle and side portions of the heat roller 71. When the middle and side portions of the heat roller 71 are to be heated, the controller 13 can energize both the center heater 731 and the side heater 732.

The temperature sensor 741 and the temperature sensor 742 are in contact with the surface of the heat roller 71 and detect the temperatures at these contact points. The temperature sensor 741 and the temperature sensor 742 are, for example, thermistors. The temperature sensor 741 and the temperature sensor 742 are arranged with respect to each other in a direction parallel to the axis of rotation of the heat roller 71. In the first configuration example illustrated in FIG. 2, the temperature sensor 741 senses the temperature of the center region C of the heat roller 71. The temperature sensor 742 senses the temperature of a side region S of the heat roller 71. In this example, a single temperature sensor 742 is used and thus it is assumed the temperatures in either side region S will be substantially equal to one another.

Each of the temperature sensors 741 and 742 has a contact portion (sensing portion) that comes into contact with the surface of the heat roller 71. The temperature sensor 741 has a sensing portion that contacts the surface of the center region C of the heat roller 71. The temperature sensor 742 has a sensing portion that contacts the surface of the side region S of the heat roller 71.

Each of the temperature sensors 741 and 742 supplies a temperature detection result signal to the controller 13. The temperature detection result signal corresponds to the measured/sensed temperature. When the center region C of the heat roller 71 is being heated, the controller 13 operates the center heater 731 based on the temperature sensed by the temperature sensor 741. If the entire heat roller 71 is being heated, the controller 13 operates the center heater 731 and the side heater 732 based on the temperatures sensed by the temperature sensors 741 and 742.

The heat roller 71 and the press roller 72 apply heat (to be controlled within a predetermined temperature range) and pressure to the print medium P passing through the fixing nip. The toner on the print medium P is fixed to the surface of the print medium P by the heat and pressure and. As a result, a toner image is fixed to the print medium P at fixing nip. The print medium P that has passed through the fixing nip is then introduced into the paper discharge conveyance path 32 and discharged to the outside of the housing 11.

Next, the configuration of the control system in the image forming apparatus 1 according to the embodiment will be described.

Figure 3:
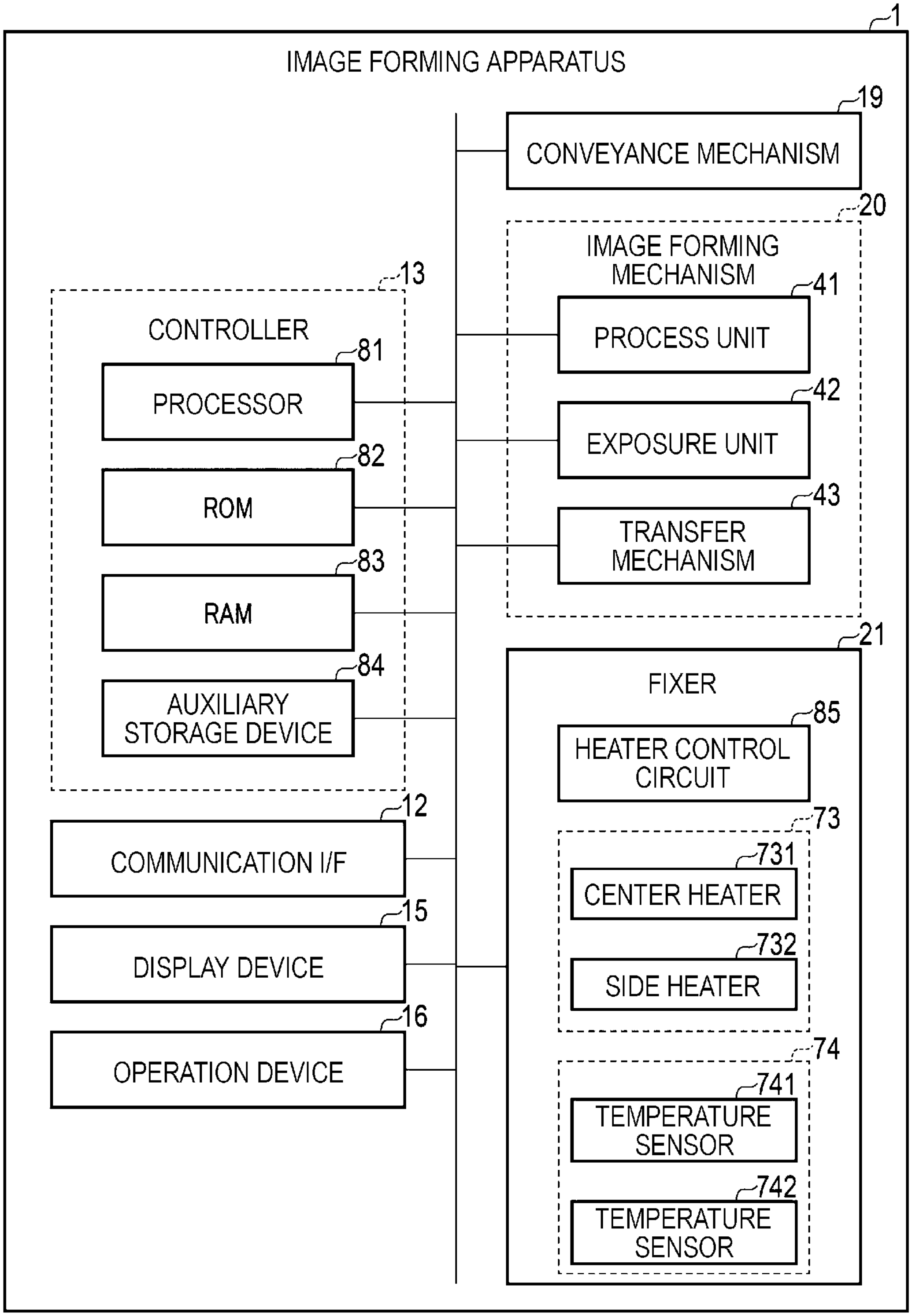
FIG. 3 is a block diagram of a control system in an image forming apparatus including a fixer.

FIG. 3 is a block diagram illustrating a configuration example of the control system in the image forming apparatus 1.

As illustrated in FIG. 3, in the image forming apparatus 1 the communication interface 12, the display device 15, the operation device 16, the conveyance mechanism 19, the image forming mechanism 20, and the fixer 21, and connect to the system controller 13.

The controller 13 includes a processor 81, a read only memory (ROM) 82, a random access memory (RAM) 83, and an auxiliary storage device 84. In addition, the controller 13 may be provided with, for example, an application specific integrated circuit (ASIC) as a processor for image processing functions.

The processor 81 controls each sub-component of the image forming apparatus 1 in accordance with an operating system and/or an application program. The processor 81 is, for example, a central processing unit (CPU).

The ROM 82 is a non-volatile memory region, and the RAM 83 is a volatile memory region. The ROM 82 stores an operating system and/or an application program. The ROM 82 stores control data necessary for the processor 81 to execute processing for controlling each sub-component. The RAM 83 is used as a work area where data can be appropriately rewritten by the processor 81. The RAM 83 has, for example, a work area for image data storage.

The auxiliary storage device 84 can be, for example, a storage device such as an electric erasable programmable read-only memory (EEPROM®), a hard disc drive (HDD), and/or a solid-state drive (SSD). The auxiliary storage device 84 stores data such as setting data used when the processor 81 performs various types of processing. The auxiliary storage device 84 saves data generated as a result of processing executed by the processor 81. The auxiliary storage device 84 may store an application program.

The controller 13 controls the image forming mechanism 20. For example, the controller 13 controls each process unit 41, the exposure unit 42, and the transfer mechanism 43. For example, the controller 13 controls ON/OFF of charging of the charger 52 of each process unit 41. The controller 13 controls ON/OFF of the laser light that is emitted to the photoreceptor drum 51 with respect to the exposure unit 42 of each process unit 41. As a result, an electrostatic latent image is formed on the photoreceptor drum 51.

The controller 13 also controls ON/OFF of development bias with respect to the developer device 53 of each process unit 41. As a result, the toner supplied from the developer device 53 develops the electrostatic latent image on the photoreceptor drum 51 to form a toner image on the photoreceptor drum 51. The controller 13 controls the primary transfer bias at each primary transfer position with respect to the transfer mechanism 43. The toner image on the photoreceptor drum 51 is transferred to the primary transfer belt 61 at the primary transfer position. The controller 13 controls the secondary transfer bias at the secondary transfer position with respect to the transfer mechanism 43. As a result, the toner image on the primary transfer belt 61 can be transferred onto the print medium P.

In addition, the controller 13 controls the fixer 21. The fixer 21 has the center heater 731, the side heater 732, the temperature sensor 741, the temperature sensor 742, and a heater control circuit 85. The heater control circuit 85 controls ON/OFF of the center heater 731 and the side heater 732. The heater control circuit 85 controls ON/OFF of the center heater 731 and the side heater 732 in accordance with control instructions from the controller 13. The controller 13 monitors the temperature(s) sensed by the temperature sensor unit 74 and the control of each heater 73 by the heater control circuit 85.

For example, the heater control circuit 85 controls ON/OFF of the center heater 731 and the side heater such that the surface of the heat roller 71 reaches a set target value. The heater control circuit 85 turns ON/OFF the center heater 731 while referring to the temperature sensed by the temperature sensor 741 such that the center region C of the heat roller 71 reaches a particular target value. The heater control circuit 85 turns ON/OFF the side heater 732 while referring to the temperature sensed by the temperature sensor 742 such that the side region S of the heat roller 71 reaches a particular target value. The target values for the different regions may be the same or different values, but the present example uses the same target value for both regions.

In addition, the heater control circuit 85 cuts off electric power supply to the center heater 731 if the temperature of the center region C reaches a set center high-temperature stop temperature (e.g., an upper limit temperature setting). Similarly, the heater control circuit 85 cuts off electric power supply to the side heater 732 if the temperature of the side region S reaches a set side high-temperature stop temperature (e.g., an upper limit temperature setting). The heater control circuit 85 has a configuration by which the center high-temperature stop temperature and the side high-temperature stop temperature can be corrected (adjusted) by the controller 13.

Next, a relationship between the ON time of the heater unit 73, the sensed (measured) temperature of the temperature sensor unit 74, and the actual temperature of the heat roller 71 that may vary depending on the dirt conditions in the fixer 21 will be described.

In this context, the "ready state" refers to a control state in which the heat roller 71 is maintained at a predetermined target temperature suitable for printing operations. For example, when the image forming apparatus 1 is initially started up, the controller 13 executes a warm-up operation to raise the temperature of the heat roller 71 to the predetermined target temperature. After the predetermined target temperature is reached, the controller 13 shifts to the ready state and maintains the heat roller 71 at the predetermined target temperature. In addition, the state in which printing is not presently being executed but the image processing apparatus 10 remains ready to perform printing on demand without needing a warming up period or the like can be referred to as a ready standby state.

Figure 4:
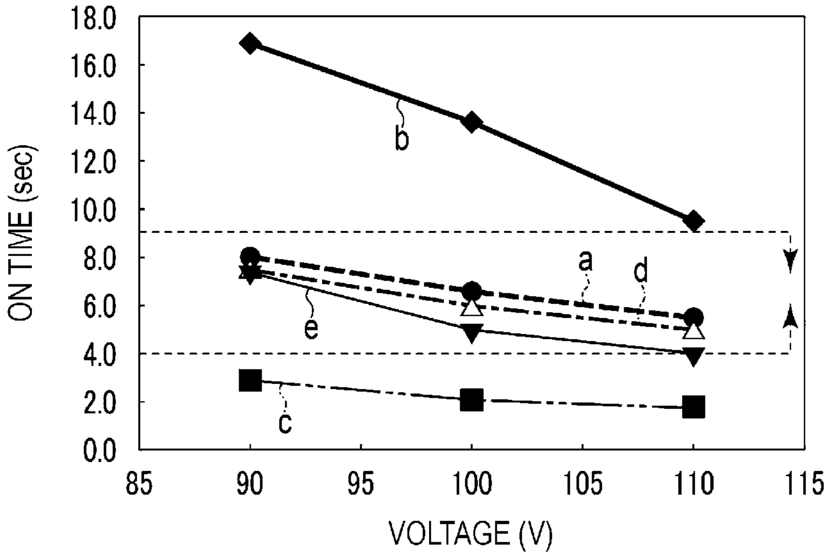
FIG. 4 is a graph illustrating a relationship between an input voltage to a center heater and the ON time of the center heater in a ready state of the fixer.

FIG. 4 is a diagram illustrating the relationship between the input voltage to the center heater 731 and the ON time of the center heater 731 while in the ready state.

Here, various dirt conditions are reproduced by attaching a dirt-simulating tape (hereinafter, referred to as a pseudo-dirt tape). The pseudo-dirt tape is, for example, a heat-resistant tape of a polyimide-based material. In addition, as the pseudo-dirt tape, a tape with a first thickness (for example, 0.43 mm) and a tape with a second thickness (for example, 0.21 mm) less than the first thickness can be selectively used to correspond to different dirt conditions.

FIG. 4 illustrates an example of measuring the input voltage to the center heater 731 and the ON time of the center heater 731 in four states (conditions) reflecting different in dirt conditions generated with pseudo-dirt tape. FIG. 4 illustrates a measurement example of the ON time (total time in the ON state) of the center heater 731 in the case of a one-minute continuous ready standby state. In the measurement example illustrated in FIG. 4, the control target of the center region C of the heat roller 71 is 166° C. and the control target of the side region S of the heat roller 71 is 160° C. It should be noted that also for FIGS. 5 to 10, it is assumed that the control target of the center region C is 166° C. and the control target of the side region S is 160° C.

Graph line a illustrated in FIG. 4 illustrates the relationship between the input voltage to the center heater 731 and the ON time of the center heater 731 when both the sensing portion of the temperature sensor 741 and the sensing portion of the temperature sensor 742 are dirt adhesion-free.

Graph line b illustrated in FIG. 4 illustrates the relationship between the input voltage and the ON time of the center heater 731 when the pseudo-dirt tape of the first thickness is attached to the sensing portion of the temperature sensor 741. The first thickness is, for example, 0.42 mm.

Graph line c illustrated in FIG. 4 illustrates the relationship between the input voltage and the ON time of the center heater 731 when the pseudo-dirt tape of the first thickness is attached to the sensing portion of the temperature sensor 742.

Graph line d illustrated in FIG. 4 illustrates the relationship between the input voltage and the ON time of the center heater 731 when the pseudo-dirt tape of f the second thickness is attached to both the sensing portion of the temperature sensor 741 and the sensing portion of the temperature sensor 742. The second thickness is less than the first thickness. For example, the second thickness is 0.21 mm.

Graph line e illustrated in FIG. 4 illustrates the relationship between the input voltage and the ON time of the center heater 731 when the pseudo-dirt tape of the first thickness is attached to both the sensing portion of the temperature sensor 741 and the sensing portion of the temperature sensor 742.

According to the example illustrated in FIG. 4, as illustrated by graph line b, if only the sensing portion of the temperature sensor 741 is in a dirt adhesion state, the ON time of the center heater 731 becomes longer than in the other states. In addition, as illustrated by graph line c of FIG. 4, if only the sensing portion of the temperature sensor 742 is in a dirt adhesion state, the ON time of the side heater becomes longer than in the other states. However, as illustrated by graph lines d and e, the ON time of the center heater 731 when both the sensing portion of the temperature sensor 741 and the sensing portion of the temperature sensor 742 are in a dirt adhesion state is not significantly different from the dirt adhesion-free state illustrated in graph line a. In addition, assuming that the dotted-line range in FIG. 4 is an allowable range, graph lines d and e as well as graph line a of a dirt adhesion-free case are within the allowable range.

Figure 5:
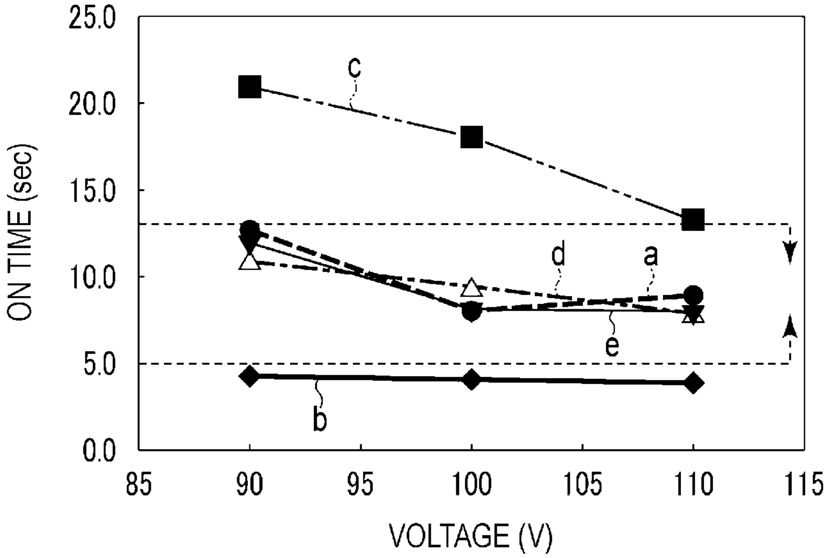
FIG. 5 is a graph illustrating a relationship between an input voltage to a side heater and the ON time of the side heater in the ready state of a fixer.

FIG. 5 is a diagram illustrating the relationship between the input voltage supplied to the side heater 732 and the ON time of the side heater 732 in the ready state.

FIG. 5 illustrates an example of measuring the input voltage to the side heater 732 and the ON time of the side heater 732 in four states reflecting different dirt conditions generated with the pseudo-dirt tape. FIG. 5 illustrates a measurement example of the ON time (total time in the ON state) of the side heater 732 in the case of a one-minute continuous ready standby state.

Graph line a illustrated in FIG. 5 illustrates the relationship between the input voltage to the side heater 732 and the ON time of the side heater 732 when both the sensing portion of the temperature sensor 741 and the sensing portion of the temperature sensor 742 are dirt adhesion-free.

Graph line b illustrated in FIG. 5 illustrates the relationship between the input voltage and the ON time of the center heater 731 when the pseudo-dirt tape of the first thickness is attached to the sensing portion of the temperature sensor 741.

Graph line c illustrated in FIG. 5 illustrates the relationship between the input voltage and the ON time of the center heater 731 when the pseudo-dirt tape of the first thickness is attached to the sensing portion of the temperature sensor 742.

Graph line d illustrated in FIG. 5 illustrates the relationship between the input voltage and the ON time of the side heater 732 when the pseudo-dirt tape of the second thickness is attached to both the sensing portion of the temperature sensor 741 and the sensing portion of the temperature sensor 742.

Graph line e illustrated in FIG. 5 illustrates the relationship between the input voltage and the ON time of the side heater 732 when the pseudo-dirt tape of the first thickness is attached to both the sensing portion of the temperature sensor 741 and the sensing portion of the temperature sensor 742.

According to the example illustrated in FIG. 5, as illustrated by graph line c, if only the sensing portion of the temperature sensor 742 is in a dirt adhesion state, the ON time of the side heater 732 becomes longer than in the other states. In addition, as illustrated by graph line b, if only the sensing portion of the temperature sensor 741 is in a dirt adhesion state, the ON time of the side heater 732 becomes short. However, as illustrated by graph lines d and e of FIG. 5, the ON time of the side heater 732 is not significantly different from a dirt adhesion-free case when both the sensing portion of the temperature sensor 741 and the sensing portion of the temperature sensor 742 are in a dirt adhesion state. In addition, assuming that the dotted-line range in FIG. 5 is an allowable range, graph lines d and e as well as graph line a of a dirt adhesion-free case are within the allowable range.

According to FIGS. 4 and 5, if only the sensing portion of the temperature sensor 741 becomes dirty, ON time ct of the center heater 731 becomes long and ON time st of the side heater 732 becomes short. If only the sensing portion of the temperature sensor 742 becomes dirty, the ON time ct of the center heater 731 becomes short and the ON time st of the side heater 732 becomes long.

Summarizing these results, if only the sensing portion of the temperature sensor 741 is dirty, the ON time ct of the center heater 731 becomes long and the ON time st of the side heater 732 becomes short. In other words, if only the sensing portion sensed by the temperature sensor 741 becomes dirty, a time difference t defined by ct−st=t becomes a large value. Conversely, if only the sensing portion of the temperature sensor 742 becomes dirty, the ON time ct of the center heater 731 becomes short and the ON time st of the side heater 732 becomes long. Therefore, the time difference t defined by ct−st=t becomes a small value (large negative value) if only the sensing portion of the temperature sensor 742 becomes dirty.

Next, the relationship between the input voltage and the ON time of the heater unit 73 depending on the dirt conditions of the sensing portions of the temperature sensors 741 and 742 in the warm-up operation of the fixer 21 will be described.

Figure 6:
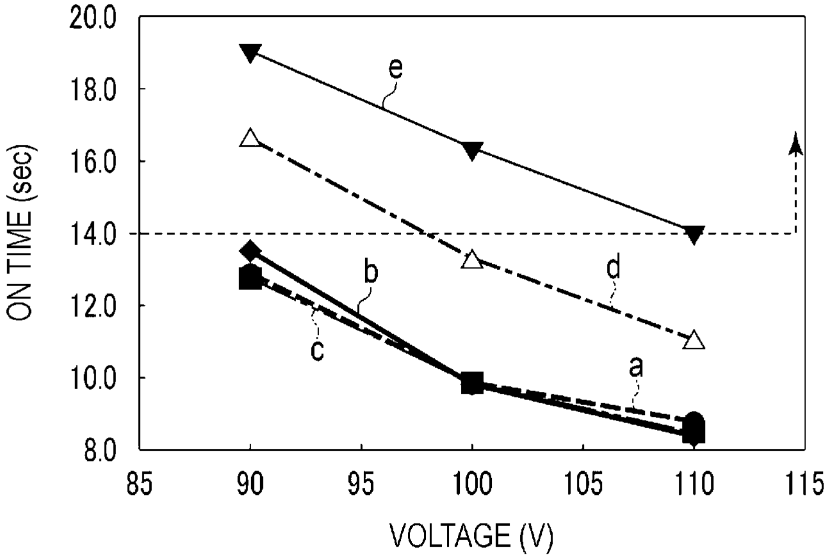
FIG. 6 is a graph illustrating a relationship between an input voltage and the simultaneous ON time of a center heater and a side heater in a warm-up operation of a fixer.

FIG. 6 is a diagram illustrating the relationship between the input voltage and the time when the center heater 731 and the side heater 732 are simultaneously turned ON (hereinafter, also referred to as the simultaneous ON time) in the warm-up operation.

FIG. 6 illustrates an example of measuring the input voltage to the heater unit 73 and the simultaneous ON time in the warm-up operation in four states reflecting different dirt conditions generated with the pseudo-dirt tape. In FIG. 6, the control target of the center region C for the warm-up operation is 150° C. and the control target of the side region S for the warm-up operation is 150° C.

Graph line a illustrated in FIG. 6 illustrates the relationship between the input voltage and the simultaneous ON time in the warm-up (WU) operation when both the sensing portion of the temperature sensor 741 and the sensing portion of the temperature sensor 742 are dirt adhesion-free.

Graph line b illustrated in FIG. 6 illustrates the relationship between the input voltage and the simultaneous ON time in the WU operation when the pseudo-dirt tape of the first thickness is attached to the sensing portion of the temperature sensor 741.

Graph line c illustrated in FIG. 6 illustrates the relationship between the input voltage and the simultaneous ON time in the WU operation when the pseudo-dirt tape of the first thickness is attached to the sensing portion of the temperature sensor 742.

Graph line d illustrated in FIG. 6 illustrates the relationship between the input voltage and the simultaneous ON time in the WU operation when the pseudo-dirt tape of the second thickness is attached to both the sensing portion of the temperature sensor 741 and the sensing portion of the temperature sensor 742.

Graph line e illustrated in FIG. 6 illustrates the relationship between the input voltage and the simultaneous ON time in the WU operation when the pseudo-dirt tape of the first thickness is attached to both the sensing portion of the temperature sensor 741 and the sensing portion of the temperature sensor 742.

In FIG. 6, the simultaneous ON time is longer in graph lines e and f pertaining to the WU operation when both the sensing portion of the temperature sensor 741 and the sensing portion of the temperature sensor 742 are in a dirt adhesion state than in graph line a pertaining to the WU operation in a dirt-free state. In addition, the simultaneous ON time is longer in thick-dirt graph line e than in graph line f. In addition, graph lines b and c pertaining to the WU operation when only one of the sensing portion of the temperature sensor 741 and the sensing portion of the temperature sensor 742 is dirty are not significantly different from Graph line a regarding the simultaneous ON time. Therefore, according to the example illustrated in FIG. 6, it is indicated that the simultaneous ON time increases as the dirt adhesion to the entire heat roller increases. Assuming that the simultaneous ON time indicated by the dotted line in FIG. 6 (14 sec) is a threshold, it can be determined that the entire heat roller 71 is dirty.

Next, a relationship between the input voltage and the actual temperature of the heater unit 73 in the ready state for different dirt conditions will be described.

Figure 7:
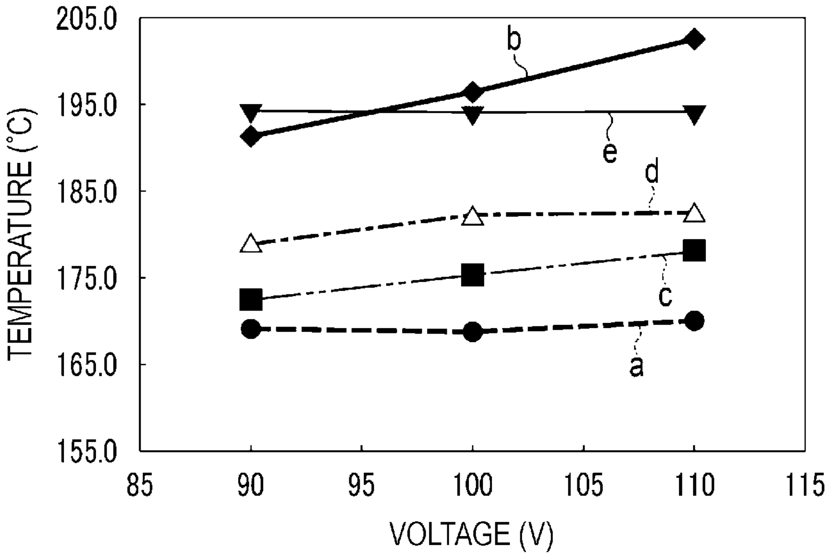
FIG. 7 is a graph illustrating a relationship between an input voltage and an actual temperature of a center region in the case of standby state continuation for a predetermined time of a fixer.

FIG. 7 is a diagram illustrating the relationship between the input voltage and the actual temperature of the center region C in the case of one-minute ready standby continuation.

FIG. 7 illustrates an example of measuring the relationship between the input voltage and the actual temperature of the center region C in four states of dirt conditions reproduced with the pseudo-dirt tape. In addition, FIG. 7 illustrates a measurement example of the actual temperature of the center region C in the case of one-minute ready standby continuation. The actual temperature can be, for example, a calculated average value of temperatures measured with a thermocouple or the like.

Graph line a illustrated in FIG. 7 illustrates the relationship between the input voltage and the actual temperature of the center region C when both the sensing portion of the temperature sensor 741 and the sensing portion of the temperature sensor 742 are dirt adhesion-free.

Graph line b illustrated in FIG. 7 illustrates the relationship between the input voltage and the actual temperature of the center region C when the pseudo-dirt tape of the first thickness is attached to the sensing portion of the temperature sensor 741.

Graph line c illustrated in FIG. 7 illustrates the relationship between the input voltage and the actual temperature of the center region C when the pseudo-dirt tape of the first thickness is attached to the sensing portion of the temperature sensor 742.

Graph line d illustrated in FIG. 7 illustrates the relationship between the input voltage and the actual temperature of the center region C when the pseudo-dirt tape of the second thickness is attached to both the sensing portion of the temperature sensor 741 and the sensing portion of the temperature sensor 742.

Graph line e illustrated in FIG. 7 illustrates the relationship between the input voltage and the actual temperature of the center region C when the pseudo-dirt tape of the first thickness is attached to both the sensing portion of the temperature sensor 741 and the sensing portion of the temperature sensor 742.

In the example illustrated in FIG. 7, comparison between graph line a and the other graph lines b to e indicates that the actual temperature rises if dirt adheres to the sensing portion of the temperature sensor 741. Comparing Graph line a and Graph line b, the temperature difference between the control target and the actual temperature is approximately 30° C. at an input voltage of 100 V. In the ready state, control is performed to maintain the control target temperature in accordance with the measured temperature(s) from the temperature sensor unit 74, and thus the control target temperature corresponds to the measured temperature from the temperature sensor unit 74. The temperature difference between the control target and the actual temperature as illustrated in FIG. 7 is a value indicating the increment (difference) between the actual temperature in the center region C compared to the temperature reported (measured/sensed) by the temperature sensor 741.

In addition, the example illustrated in FIG. 7 indicates a tendency that the increment from the actual temperature in the center region C increases as the amount of dirt that adheres to the sensing portion of the temperature sensor 741 increases. In other words, the measurement example illustrated in FIG. 7 indicates that the temperature difference between the sensing temperature from the temperature sensor 741 and the actual temperature in the center region C varies with the amount of dirt that adheres to the sensing portion of the temperature sensor 741.

Figure 8:
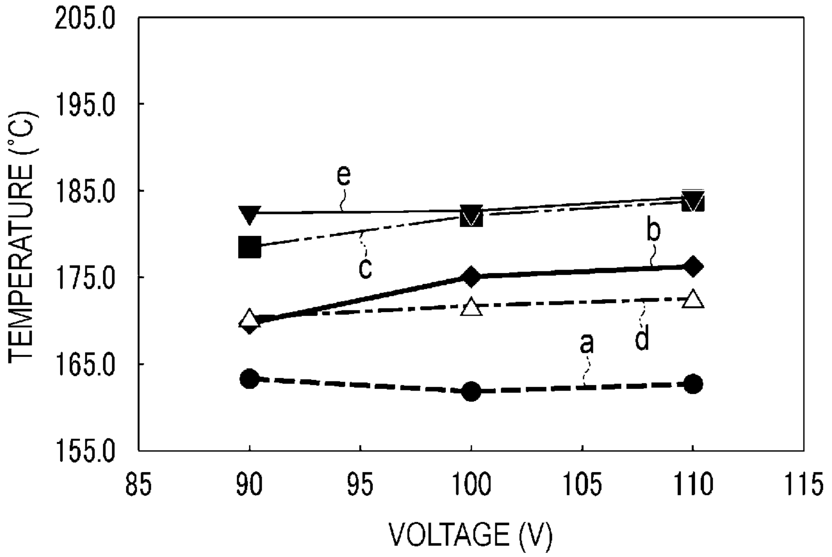
FIG. 8 is a graph illustrating a relationship between an input voltage and an actual temperature of a side region in the case of standby state continuation for a predetermined time of a fixer.

FIG. 8 is a diagram illustrating the relationship between the input voltage and the actual temperature of the side region S in the case of a one-minute ready standby period.

FIG. 8 illustrates an example of measuring the relationship between the input voltage and the actual temperature of the side region S in four states of different dirt conditions reproduced with the pseudo-dirt tape. FIG. 8 illustrates a measurement example of the actual temperature of the side region S in the case of one-minute ready standby period. The actual temperature value can be, for example, a calculated average value of temperatures measured with a thermocouple or the like.

Graph line a illustrated in FIG. 8 illustrates the relationship between the input voltage and the actual temperature of the side region S when both the sensing portion of the temperature sensor 741 and the sensing portion of the temperature sensor 742 are dirt adhesion-free.

Graph line b illustrated in FIG. 8 illustrates the relationship between the input voltage and the actual temperature of the side region S when the pseudo-dirt tape of the first thickness is attached to the sensing portion of the temperature sensor 741.

Graph line c illustrated in FIG. 8 illustrates the relationship between the input voltage and the actual temperature of the side region S when the pseudo-dirt tape of the first thickness is attached to the sensing portion of the temperature sensor 742.

Graph line d illustrated in FIG. 8 illustrates the relationship between the input voltage and the actual temperature of the side region S when the pseudo-dirt tape of the second thickness is attached to both the sensing portion of the temperature sensor 741 and the sensing portion of the temperature sensor 742.

Graph line e illustrated in FIG. 8 illustrates the relationship between the input voltage and the actual temperature of the side region S when the pseudo-dirt tape of the first thickness is attached to both the sensing portion of the temperature sensor 741 and the sensing portion of the temperature sensor 742.

In the example illustrated in FIG. 8, comparison between graph line a and the other graph lines b to e indicates that the actual temperature of the side region S rises if dirt adheres to the sensing portion of the temperature sensor 742. Comparing graph line a and graph line b, the temperature difference between the control target temperature and the actual temperature is approximately 20° C. at an input voltage of 100 V. In the ready state, the control target of the side region S corresponds to the measured temperature of the temperature sensor 742. Therefore, the temperature difference between the control target and the actual temperature illustrated in FIG. 8 is a value indicating the increment from the actual temperature in the side region S to the temperature reported (measured) by the temperature sensor 742.

In addition, the example illustrated in FIG. 8 indicates a tendency that the increment from the actual temperature in the side region S increases as the amount of dirt that adheres to the sensing portion of the temperature sensor 742 increases. In other words, the measurement example illustrated in FIG. 8 indicates that the temperature difference between the measured temperature of the temperature sensor 742 and the actual temperature in the side region S varies with the amount of dirt that adheres to the sensing portion of the temperature sensor 742.

Next, the relationship between the difference in ON time between the center heater 731 and the side heater 732 and the increment in actual temperature in the heat roller 71 (center region C and side region S) will be described.

Figure 9:
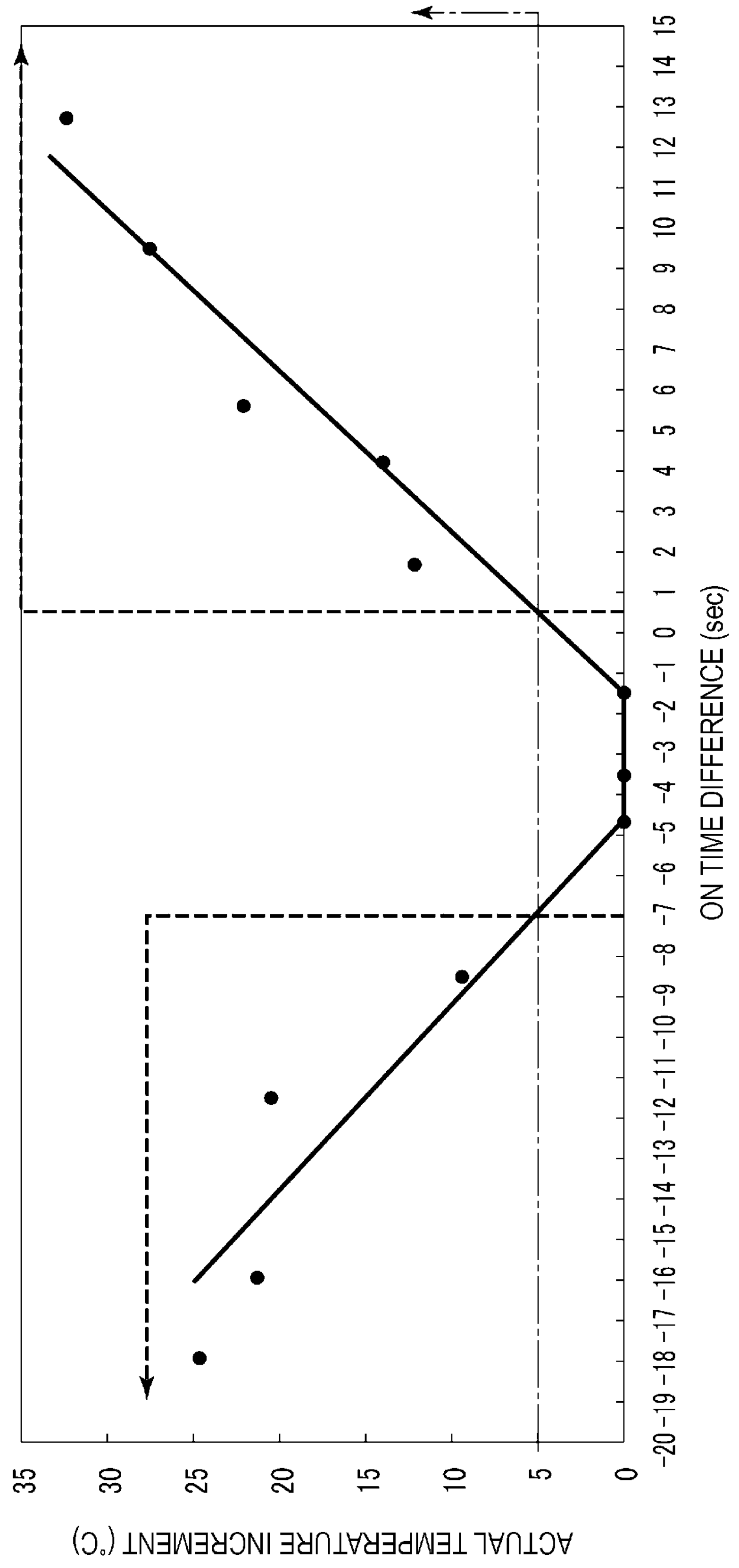
FIG. 9 is a graph illustrating a relationship between a difference in ON time between a center heater and a side heater and an increment in an actual temperature of a heat roller in a fixer.

FIG. 9 is a diagram illustrating the relationship (function) between the difference in ON time between the center heater 731 and the side heater 732 and the increment in actual temperature in the heat roller 71.

FIG. 9 illustrates a graph representing the relationship between the increment (offset) in actual temperature and differences in ON time obtained from values calculated based on the measurement results illustrated in FIGS. 4 to 8. In other words, FIG. 9 illustrates a relationship between the value of difference t (difference in ON time between the center heater 731 and the side heater 732) and the difference (increment) between measured temperature and the actual temperature of the heat roller 71 for a one-minute ready standby period.

In this context, the "actual temperature increment" refers to the temperature difference between the actual heat roller temperature and the control target temperature (as sensed by the temperature sensor unit 74). The control target is the target value the controller 13 attempts to reach using the temperature sensed by the temperature sensor unit 74 for control purposes. Therefore, when the control target is being maintained, the controller 13 turns heating ON/OFF as deemed necessary for the temperature reported by the temperature sensor unit 74 to equal the control target value (setpoint). In other words, when the control target is being maintained, the temperature difference between the temperature reported by the temperature sensor unit 74 and the actual temperature of the heat roller 71 (e.g., as measured by some other means other than the temperature sensor unit 74) is referred to as the actual temperature increment.

Here, a difference t in ON time is the value that is obtained by subtracting the ON time st of the side heater 732 from the ON time ct of the center heater 731 (t=ct−st). FIG. 9 indicates the actual temperature increment of the center region C for an ON time difference of −2.5 sec or more and indicates the actual temperature increment of the side region S for an ON time difference of −5 sec or less.

Figure 10:
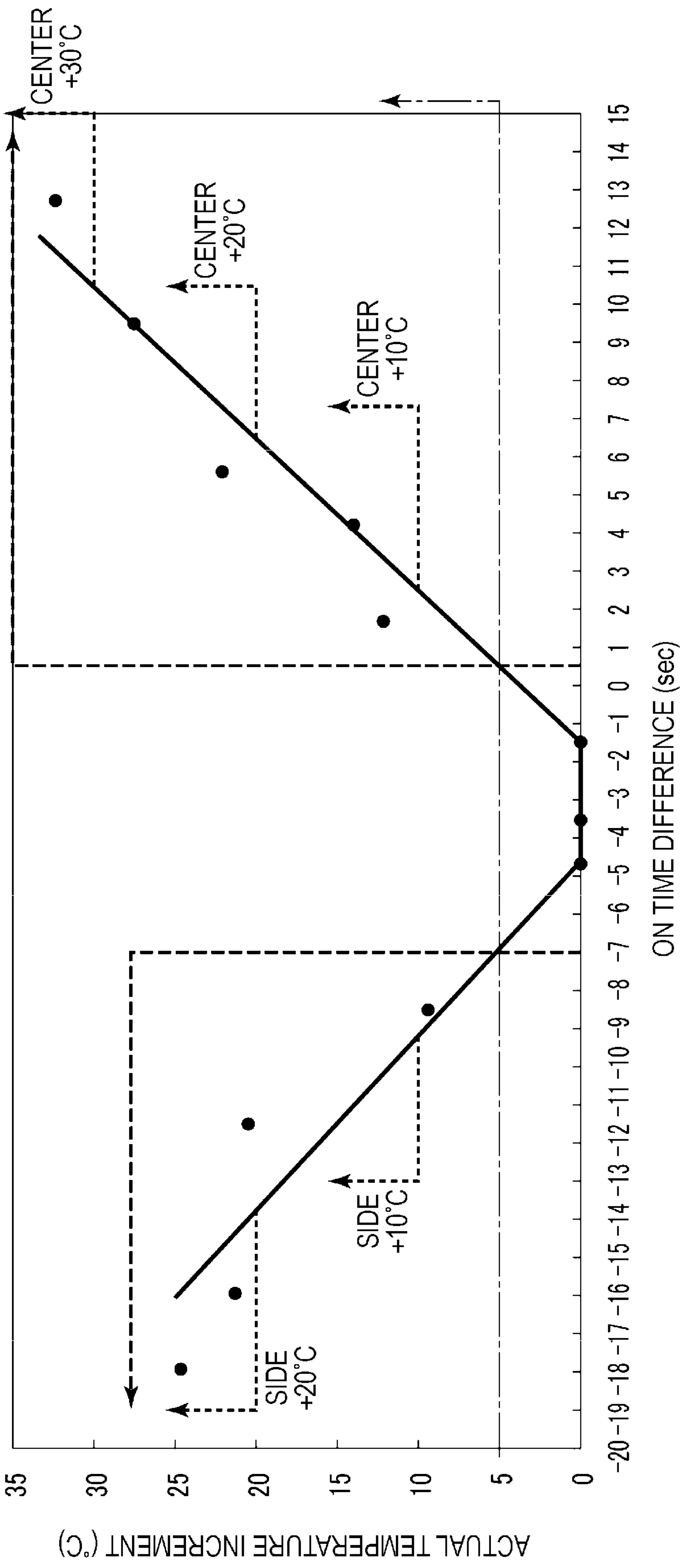
FIG. 10 is a graph illustrating a determination example for identifying an increment in actual temperature in a center region and a side region based on the aspects illustrated in FIG. 9.

FIG. 10 is a diagram illustrating a determination example of actual temperature increment determination in the center region C and the side region S based on illustrated in FIG. 9.

In the example illustrated in FIG. 10, it is determined that the actual temperature increment of the center region C is 30° C. if the ON time difference t is 10 seconds or more. If the ON time difference t is in the range of 6 sec to 10 sec, it is determined that the actual temperature increment of the center region C is 20° C. If the ON time difference t is in the range of 2 sec to 6 sec, it is determined that the actual temperature increment of the center region C is 10° C. If the ON time difference t is in the range of −9 sec to 2 sec, it is determined that each of the actual temperature increments of the center region C and the side region is within a normal range. If the ON time difference t is in the range of −9 sec to −14 sec, it is determined that the actual temperature increment of the side region C is 10° C. If the ON time difference t is beyond −14 sec, it is determined that the actual temperature increment of the side region C is 20° C.

FIG. 11 is a diagram illustrating a table summarizing the results of determination of the actual temperature increment with respect to the ON time differences illustrated in FIG. 10.

The table illustrated in FIG. 11 stores information indicating the value of the increment in actual temperature with respect to the time difference t. The table illustrated in FIG. 11 is saved in, for example, the auxiliary storage device 84. The information illustrated in FIG. 11 is the same as the information illustrated in FIG. 10, but presented in tabular form rather than graphic.

In other words, in the table illustrated in FIG. 11, it is determined (estimated) that the actual temperature increment of the center region C is 30° C. if the ON time difference t is 10 sec or beyond ($10 \leq t$). If the ON time difference t is in the range of 6 sec to 10 sec ($6 \leq t < 10$), it is determined that the actual temperature increment of the center region C is 20° C. If the ON time difference t is in the range of 2 sec to 6 sec ($2 \leq t < 6$), it is determined that the actual temperature increment of the center region C is 10° C.

If the ON time difference t is in the range of −9 sec to 2 sec ($2 > t > -9$), it is determined that each of the actual temperature increments of the center region C and the side region is within a normal range. If the ON time difference t is in the range of −9 sec to −14 sec ($-9 \geq t > -14$), it is determined that the actual temperature increment of the side region C is 10° C. If the ON time difference t is −14 sec or beyond ($-14 \geq t$), it is determined that the actual temperature increment of the side region C is 20° C.

The image forming apparatus 1 and the fixer 21 according to an embodiment refer to the table illustrated in FIG. 11 to determine the value of the increment in actual temperature based on the value of the time difference t. For example, the controller 13 acquires the ON time ct of the center heater 731 and the ON time st of the side heater 732 in the case of ready standby continuation for a predetermined time period (for example, one minute). The controller 13 calculates the ON time difference t from the difference between the value for ON time ct of the center heater 731 and the value for ON time st of the side heater 732. Based on the table illustrated in FIG. 11, the controller 13 identifies the increment in actual temperature corresponding to the calculated ON time difference t.

Next, the operation of failure prediction processing in the image forming apparatus 1 including the fixer 21 according to an embodiment will be described.

Figure 12:
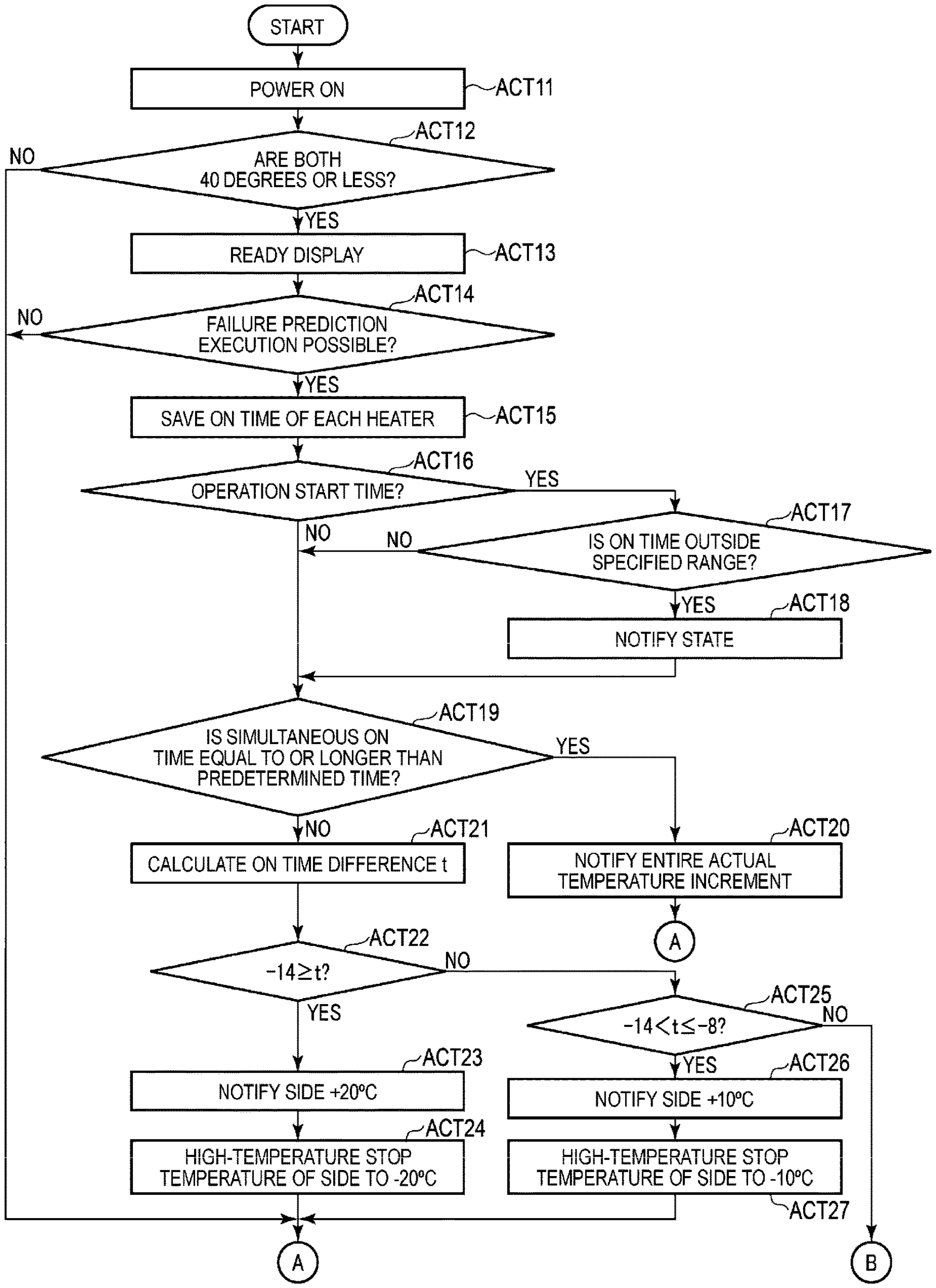
FIG. 12 is a flowchart for describing an operation example of failure prediction processing in an image forming apparatus including a fixer.
Figure 13:
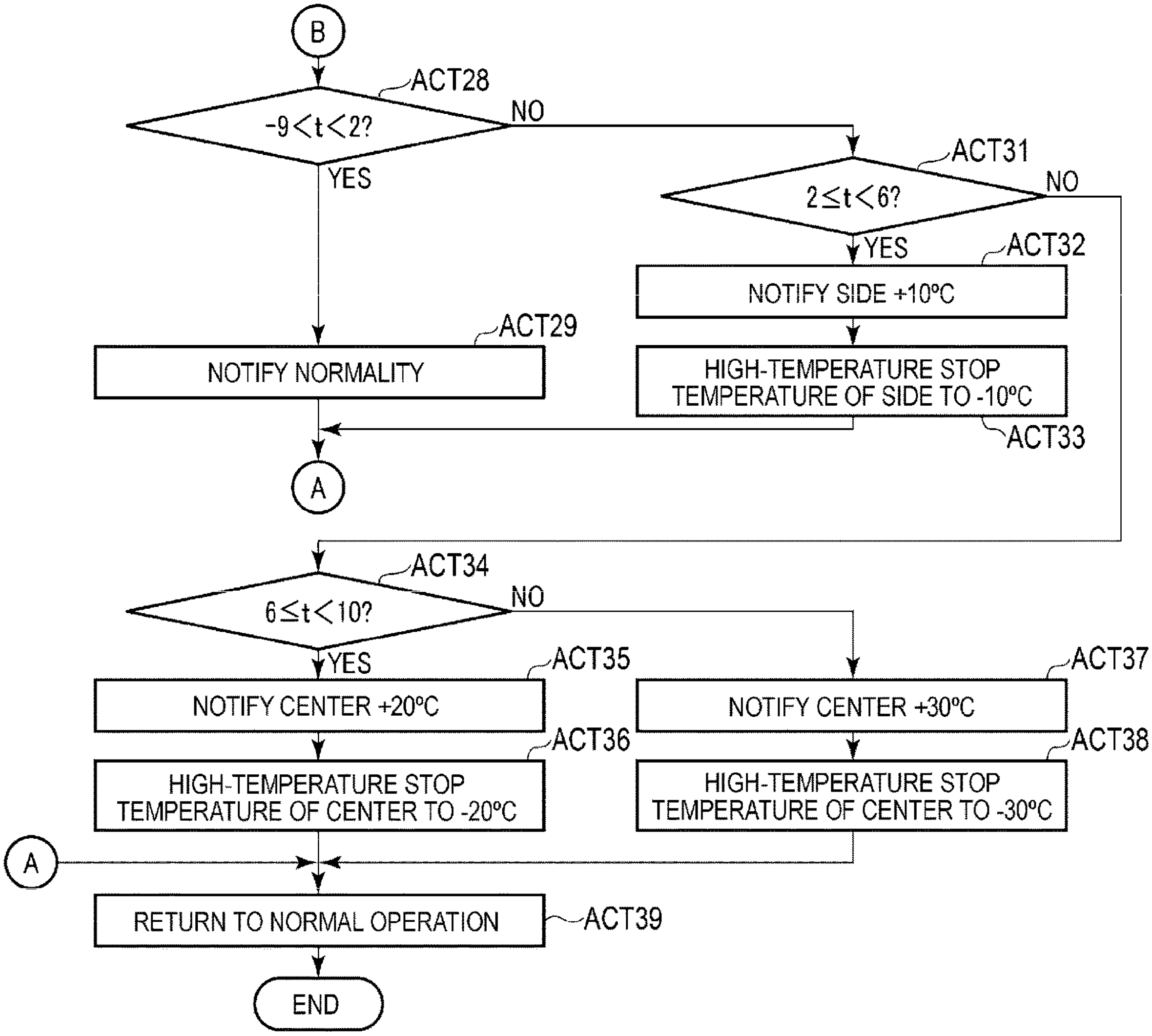
FIG. 13 is a flowchart for describing an operation example of a failure prediction processing in an image forming apparatus including a fixer.

FIGS. 12 and 13 are flowcharts for describing an operation example of the failure prediction processing in the image forming apparatus 1 including the fixer 21 according to an embodiment.

For example, the controller 13 performs the failure prediction processing by the processor 81 executing a program for failure prediction processing. The program for failure prediction processing executed by the processor 81 can be stored in a non-volatile memory such as the ROM 82 and/or the auxiliary storage device 84.

First, the controller 13 turns ON (powers up) the entire image forming apparatus 1 (ACT 11). After the entire apparatus is turned ON, the controller 13 acquires the temperature sensed by the temperature sensor 741 and the temperature sensed by the temperature sensor 742. The controller 13 checks at this time whether both the sensing temperature of the temperature sensor 741 and the sensing temperature of the temperature sensor 742 are 40 degrees or less (ACT 12).

The controller 13 omits (ends) the failure prediction processing if either the sensed temperature of the temperature sensor 741 or the sensed temperature of the temperature sensor 742 exceeds 40 degrees (ACT 12, NO). If the failure prediction processing is to be omitted, the controller 13 proceeds to ACT 39 and shifts to the normal operation.

The controller 13 proceeds to the warm-up operation if both the sensed temperature of the temperature sensor 741 and the sensed temperature of the temperature sensor 742 are 40 degrees or less (ACT 12, YES). Once the warm-up operation is completed, the controller 13 shifts to the ready state and displays a guide message ("ready display") indicating the ready state on the display device 15 (ACT 13).

In addition, the controller 13 records information indicating the times when the center heater 731 and the side heater 732 are simultaneously energized during the warm-up operation in the RAM 83 (or the auxiliary storage device 84). For example, the controller 13 acquires, from the heater control circuit 85, information indicating the total length of time when the center heater 731 and the side heater 732 were both energized during the warm-up operation.

The controller 13 counts the time after the shift to the ready state. The controller 13 determines whether the ready standby state duration reaches or exceeds some predetermined time (for example, 1 minute) based on the counted duration (ACT 14).

If the duration does not reach or exceed the predetermined time (ACT 14, NO), the controller 13 omits the failure prediction and returns to the normal operation (ACT 39). For example, if printing is started before the duration becomes equal to or longer than the predetermined time, the controller 13 omits the failure prediction and executes the printing operation.

If the duration becomes equal to or longer than the predetermined time (ACT 14, YES), the controller 13 saves the ON time of the heater unit 73 during the period of time corresponding to the predetermined time (ACT 15). For example, the controller 13 acquires, from the heater control circuit 85, information indicating the ON time of the center heater 731 and the side heater 732 during the most recent predetermined time (one minute) period in the ready standby state. The controller 13 calculates the total value of the time when the center heater 731 was turned ON during the one-minute standby period as the ON time of the center heater 731. The controller 13 saves the calculated ON time of the center heater 731 in the RAM 83 or the auxiliary storage device 84. In addition, the controller 13 calculates the total value of the time when the side heater 732 was turned ON during the same standby period as the ON time of the side heater 732. The controller 13 saves the calculated ON time of the side heater 732 in the RAM 83 or the auxiliary storage device 84.

After saving the ON time of each heater of heater unit 73, the controller 13 determines whether it is time to start the operation of the image forming apparatus 1 (ACT 16). For example, the controller 13 determines whether it is time to start the operation based on whether the mode is "setup," which is executed when the image forming apparatus 1 is first installed, for example. In addition, the controller 13 may determine whether it is time to start the operation based on whether the total print count is equal to or less than some predetermined number of sheets.

If the apparatus is at the start of the operation (ACT 16, YES), the controller 13 next checks whether an ON time is outside a specified range (ACT 17). For example, according to the example illustrated in FIG. 4, the ON time of the center heater 731 can be in the range of 4.0 to 9.0 seconds (specified range) when in a normal state. It is assumed that there is no dirt adhesion entailed by use at the start of the operation. Therefore, if the ON time of the center heater 731 is in or out of the specified range (4.0 to 9.0 seconds) at the start of the operation, it can be determined whether any abnormal state occurs. In addition, according to the example illustrated in FIG. 5, the ON time of the side heater 732 is in the range of 5.0 to 12.5 seconds (specified range) when in a normal state. Therefore, if the ON time of the side heater 732 is in or out of the specified range (5.0 to 12.5 seconds) at the start of the operation, it can be determined whether any abnormal state occurs.

If the ON time of the center heater 731 or the ON time of the side heater 732 is outside the specified range (ACT 17, YES), the controller 13 notifies the abnormal state (ACT 18). For example, the controller 13 outputs abnormal state-indicating information to a service man via the communication interface 12.

In addition, the controller 13 may notify a service man of information indicating that the power supply situation of the image forming apparatus 1 may be poor, that the temperature sensor may be abnormal, or the like. In addition, the controller 13 may display abnormal state-indicating information on the display device 15. It should be noted, the controller 13 may be operable even with the ON time being outside the specified range and thus proceeds to ACT 19 after abnormal state notification.

If the ON time of the center heater 731 and the side heater 732 is within the specified range (ACT 17, NO), the controller 13 next determines whether the simultaneous ON time in the WU operation is equal to or greater than some predetermined time (ACT 19). This determination is to predict the rise in the actual temperature of the entire heat roller 71 attributable to dirt or the like. For example, in the example illustrated in FIG. 6, if the simultaneous ON time in the WU operation is 14 seconds or longer, it can be determined that the actual temperature may rise by 30 degrees or more beyond the control target.

If the simultaneous ON time in the WU operation is equal to or longer than the predetermined time (ACT 19, YES), the controller 13 notifies that the actual temperature may be higher than the control target by some amount (ACT 20). For example, the controller 13 outputs, to a service man via the communication interface 12, information indicating that the actual temperature may be high or that the entire heat roller 71 is dirty. In addition, the controller 13 may display, on the display device 15, information indicating that the actual temperature may be high or that the entire heat roller 71 may be dirty. In addition, the controller 13 proceeds to ACT 39 and shifts to the normal operation after notifying that the actual temperature is high or that the entire heat roller 71 is dirty.

If the simultaneous ON time in the WU operation is less than the predetermined time (ACT 19, NO), the controller 13 calculates the ON time difference t between the center heater 731 and the side heater 732 (ACT 21). For example, the processor 81 of the controller 13 reads out the ON time ct of the center heater 731 and the ON time st of the side heater 732 for the most recent standby period saved in the RAM 83 (or the auxiliary storage device 84). The processor 81 calculates the ON time difference t by subtracting the ON time st of the side heater 732 from the ON time ct of the center heater 731.

After calculating the ON time difference t, the controller 13 determines (estimates) the actual temperature increment (offset) corresponding to the ON time difference t. For example, the processor 81 of the controller 13 refers to a table such as that illustrated in FIG. 11 to determine the actual temperature increment in each region corresponding to the ON time difference t. In FIGS. 12 and 13, an example of actual temperature increment determination based on the table illustrated in FIG. 11 is described.

In the example illustrated in FIGS. 12 and 13, the controller 13 determines whether the ON time difference t is −14 degrees or beyond (ACT 22). If the ON time difference t is −14 or beyond (ACT 22, YES), the controller 13 determines (estimates) from the table illustrated in FIG. 11 that the actual temperature is higher than the target temperature by 20 degrees in the side region S of the heat roller 71.

If $-14 \geq t$, the controller 13 notifies that there is a possibility that the actual temperature of the side region S is greater than 20 degrees above the control target (ACT 25). For example, the controller 13 notifies a service man via the communication interface 12 that there is a possibility that the actual temperature of the side region S is high by at least 20° C. In addition, the controller 13 may display, on the display device 15, that the actual temperature of the side region S is high by 20° C. or that the side region S may be dirty.

In addition, if the controller 13 determines that the actual temperature of the side region S is high by 20 degrees, the controller 13 updates the high-temperature stop temperature of the side region S to −20° C. (ACT 24). The controller 13 or the heater control circuit 85 forcibly turns OFF the side heater 732 if the temperature sensed by the temperature sensor 742 exceeds the high-temperature stop temperature (side high-temperature stop temperature). By updating the side high-temperature stop temperature by −20° C. for an estimated 20° ° C. offset in the actual temperature of the side region S determined, an abnormal temperature of the side region S can be prevented.

In addition, the controller 13 notifies the rise in actual temperature, updates the side high-temperature stop temperature in accordance with the offset in actual temperature, and then proceeds to ACT 39 to shift to the normal operation.

If the ON time difference t is not −14 degrees or beyond (ACT 22, NO), the controller 13 next determines whether the ON time difference t is $-14 < t \leq -8$ (ACT 25). If the ON time difference t is $-14 < t \leq -8$ (ACT 25, YES), the controller 13 determines (identifies) from the table illustrated in FIG.

11 that the actual temperature is higher by 10° C. in the side region S of the heat roller 71.

If $-14<t\leq-8$, the controller 13 notifies, via the communication interface 12, that there is a possibility that the actual temperature of the side region S is higher by 10° C. (ACT 25). For example, the controller 13 notifies a service man via the communication interface 12 that there is a possibility that the actual temperature of the side region S is high by 10° C. In addition, the controller 13 may display, on the display device 15, that the actual temperature of the side region S is higher by 10° C., that the side region S may be dirty, or the like.

In addition, if the controller 13 determines that the actual temperature of the side region S is high by 10° C., the controller 13 updates the high-temperature stop temperature of the side region S by subtracting 10° C. (ACT 24). By updating the side high-temperature stop temperature by −10° ° C. to account an estimated 10° C. offset in the actual temperature of the side region S, an abnormal temperature of the side region S can be prevented.

In addition, the controller 13 notifies that actual temperature is high, updates the side high-temperature stop temperature, and then proceeds to ACT 39 to shift to the normal operation.

If the ON time difference t is not $-14<t\leq-8$ (ACT 25, NO), the controller 13 next determines whether the ON time difference t is $-9<t<2$ (ACT 28). If the ON time difference t is $-9<t<2$ (ACT 28, YES), the controller 13 determines from the table illustrated in FIG. 11 that the actual temperature of the heat roller 71 is in a normal range.

If ON time difference t is in the normal range ($-9<t<2$), the controller 13 notifies that the actual temperature of the heat roller 71 is in a normal range (ACT 29). For example, the controller 13 notifies a service man via the communication interface 12 that the actual temperature of the heat roller 71 is in a normal range. In some examples, the controller 13 may not output an actual notification of normality and normality may be identified/notified by the lack of notification output. The controller 13 then proceeds to ACT 39 and shifts to the normal operation.

If the ON time difference t is not $-9<t<2$ (ACT 28, NO), the controller 13 next determines whether the ON time difference t is $2\leq t<6$ (ACT 31). If the ON time difference t is $2\leq t<6$ (ACT 31, YES), the controller 13 determines (identifies) from the table illustrated in FIG. 11 that the actual temperature is high by 10° C. in the center region C of the heat roller 71.

If ON time difference t is $2\leq t<6$, the controller 13 notifies that there is a possibility that the actual temperature of the center region C is high by 10° C. (ACT 32). For example, the controller 13 notifies a service man via the communication interface 12 that there is a possibility that the actual temperature of the center region C is high by 10° C. The controller 13 may display, on the display device 15, that the actual temperature of the center region C is high by 10° C., that the center region C may be dirty, or the like.

If the controller 13 determines that the actual temperature of the center region C is high by 10° C., the controller 13 updates the high-temperature stop temperature of the center region C by subtracting 10° C. (ACT 33). By updating the center high-temperature stop temperature to account for the 10° C. rise in the actual temperature of the center region C, an abnormal temperature of the center region C can be prevented.

In addition, the controller 13 notifies the actual temperature is high, updates the side high-temperature stop temperature, and then proceeds to ACT 39 to shift to the normal operation.

If the ON time difference t is not $2\leq t<6$ (ACT 31, NO), the controller 13 next determines whether the ON time difference t is $6\leq t<10$ (ACT 34). If the ON time difference t is $6\leq t<10$ (ACT 34, YES), the controller 13 determines (identifies) from the table illustrated in FIG. 11 that the actual temperature is high by 20° C. in the center region C of the heat roller 71.

If the ON time difference t is $6\leq t<10$, the controller 13 notifies that there is a possibility that the actual temperature of the center region C is high by 20° C. (ACT 32). For example, the controller 13 notifies a service man via the communication interface 12 that there is a possibility that the actual temperature of the center region C is high by 20° C. The controller 13 may display, on the display device 15, that the actual temperature of the center region C is high by 20° C., that the center region C may be dirty, or the like.

If the controller 13 determines that the actual temperature of the center region C is high by 20° C., the controller 13 updates the high-temperature stop temperature of the center region C by subtracting 20° C. (ACT 33). By updating the center high-temperature stop temperature, an abnormal temperature of the center region C can be prevented.

The controller 13 notifies the increase in actual temperature, updates the side high-temperature stop temperature and then proceeds to ACT 39 to shift to the normal operation.

If the ON time difference t is not $6\leq t<10$ (ACT 34, NO), the controller 13 next determines that the ON time difference t is 10° C. or more. If the ON time difference t is $10\leq t$, the controller 13 determines (identifies) from the table illustrated in FIG. 11 that the actual temperature is high by 30° C. in the center region C of the heat roller 71.

If the ON time difference t is $10\leq t$, the controller 13 notifies that there is a possibility that the actual temperature of the center region C is high by 30° C. (ACT 37). For example, the controller 13 notifies a service man via the communication interface 12 that there is a possibility that the actual temperature of the center region C is high by 30° C. In addition, the controller 13 may display, on the display device 15, that the actual temperature of the center region C is high by 30° C., that the center region C may be dirty, or the like.

If the controller 13 determines that the actual temperature of the center region C is high by 30° C., the controller 13 updates the high-temperature stop temperature of the center region C by subtracting 30° C. (ACT 33). By updating the center high-temperature stop temperature, an abnormal temperature of the center region C can be prevented.

In addition, the controller 13 notifies the change in actual temperature, updates the side high-temperature stop temperature in accordance with the change in actual temperature, and then proceeds to ACT 39 to shift to the normal operation.

As described above, the image forming apparatus 1 including the fixer 21 according to the embodiment estimates the actual temperatures from the ON time of each heater in the ready standby state to adjust measured temperatures to account for corresponding to the possibility of dirt at the sensing position of the temperature sensors 741 and 742. As a result, it is possible to control the actual temperature to be at the intended control target by accounting for dirt at the sensing position of the temperature sensor. In addition, the image forming apparatus 1 notifies a service man or the like of the estimated actual temperature and the adjustment made to the measured temperature to account for dirt at the sensing position of a temperature sensor. As a result, service handling is possible before a failure resulting from deterioration or breakage of various members attributable to high-temperature use occurs and failure-attributable downtime can be avoided.

The image forming apparatus 1 including the fixer 21 of the first configuration example illustrated in FIGS. 1 and 2 is described above. However, the configuration of the fixing device applied to the image forming apparatus 1 according to an embodiment is not limited to the first configuration example. The fixing devices of second to fifth configuration examples to be described below can be applied to the image forming apparatus 1

The modification examples of the fixing device applicable to an image forming apparatus 1 according to an embodiment will be described below.

Figure 14:
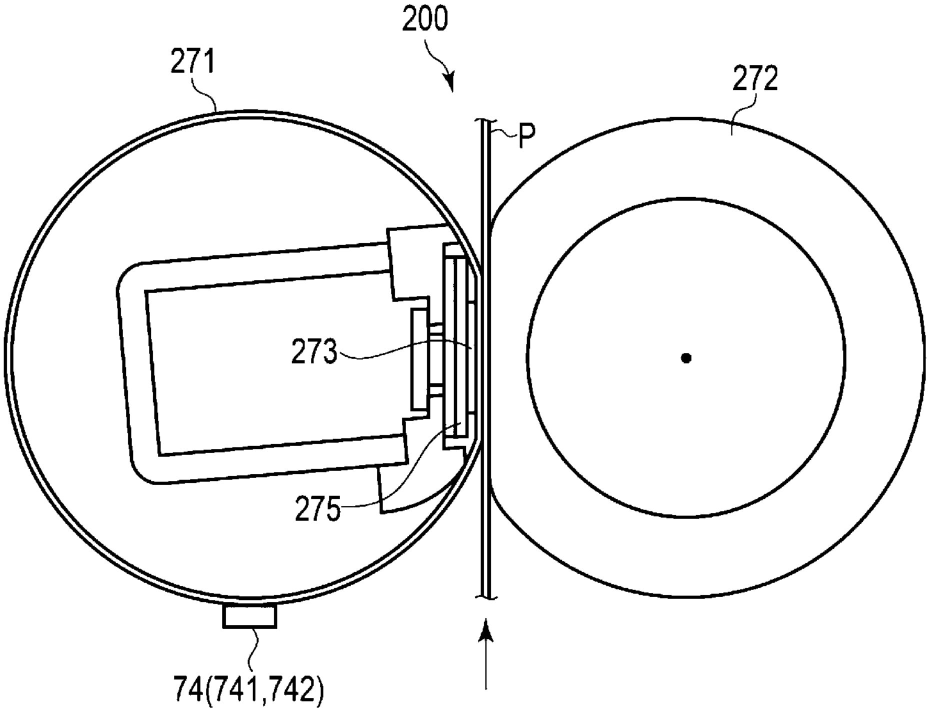
FIG. 14 is a diagram illustrating a second configuration example of a fixer.
Figure 15:
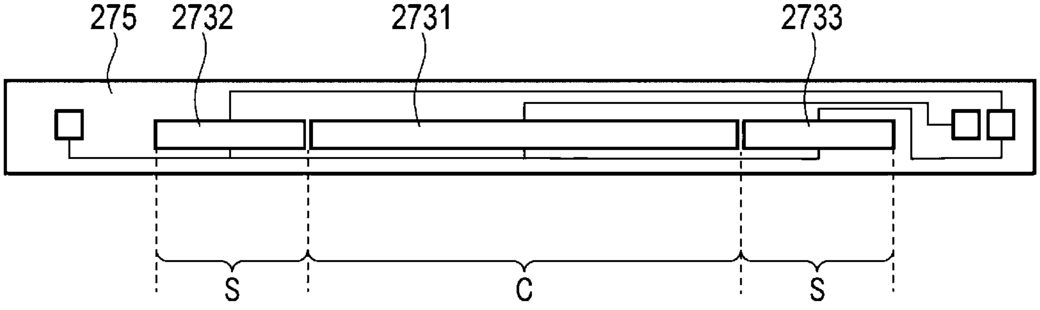
FIG. 15 is a diagram illustrating a configuration example of a heater unit in a fixer of a second configuration example.

FIG. 14 is a diagram illustrating a configuration example of a fixer 200, which is the second example of the fixing device applicable to the image forming apparatus 1 according to an embodiment. In addition, FIG. 15 is a diagram illustrating a configuration example of a heater unit in the fixer 200.

As illustrated in FIG. 14, the fixer 200 includes a temperature sensor unit 74 (temperature sensors 741, 742), a tubular film 271 as a fixing member, a pressing roller 272, a heating element 273, and a heating element substrate 275. The pressing roller 272 forms a nip with the tubular film 271. The tubular film 271 and the pressing roller 272 heat and press the print medium P entering the nip.

The heater unit includes the heating element 273 and the heating element substrate 275. The heating element substrate 275 is formed of a metal material, a ceramic material, or the like. The heating element substrate 275 is formed in an elongated rectangular plate shape. The heating element substrate 275 is disposed inside the tubular film 271. The longitudinal direction of the heating element substrate 275 is parallel to the axial direction of the tubular film 271.

The heating element 273 includes a middle heating element 2731, a first end heating element 2732, and a second end heating element 2733. The three heating elements 2731, 2732, and 2733 are disposed side by side in a direction orthogonal to the paper conveyance direction (the longitudinal direction of the heating element substrate 275). The middle heating element 2731 is disposed such that the middle position in the width direction (the direction orthogonal to the conveyance direction) of the print medium P passing through the nip in the width direction will be aligned. The first end heating element 2732 and the second end heating element 2733 are disposed on both sides of the middle heating element 2731.

The middle heating element 2731 is an example of a first heat source. As illustrated in FIG. 15, the middle heating element 2731 supplies heat mainly to the center region C. However, even when only the middle heating element 2731 is used to generate heat, the temperature of the side region S also rises. The first end heating element 2732 and the second end heating element 2733 are examples of a second heat source. As illustrated in FIG. 15, the first end heating element 2732 and the second end heating element 2733 supply heat mainly to the side region S.

As in the first configuration example, the temperature sensors 741 and 742 are contact-type temperature sensing devices such as thermistors. The temperature sensor 741 senses the temperature of the position corresponding to the center region C. In addition, the temperature sensor 742 senses the temperature of the position corresponding to a side region S.

The image forming apparatus 1 including the fixer 200 illustrated in FIGS. 14 and 15 is capable of performing failure prediction processing such as that described above. However, the table illustrated in FIG. 11 cannot be applied directly to the image forming apparatus including the fixer 200. Characteristics such as those illustrated in FIGS. 4 to 10 must be measured and determined for the image forming apparatus including the fixer 200 so the failure prediction processing described above can be based on the result of the measurements.

Next, a fixer 300, which is the third example of the fixer applicable to the image forming apparatus 1 according to the embodiment, will be described.

Figure 16:
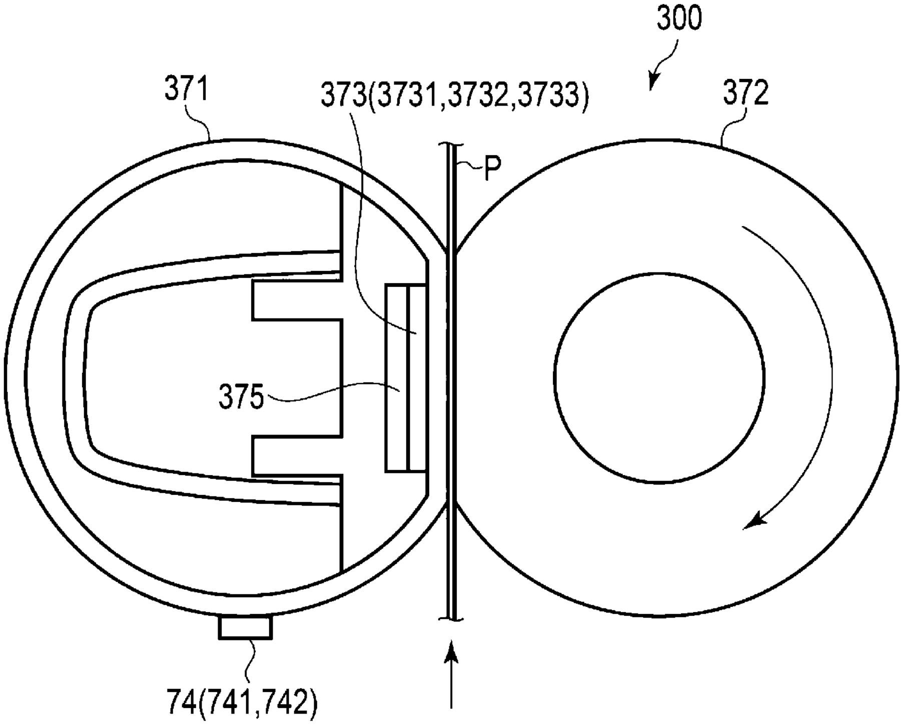
FIG. 16 is a diagram illustrating a third configuration example of a fixer.
Figure 17:
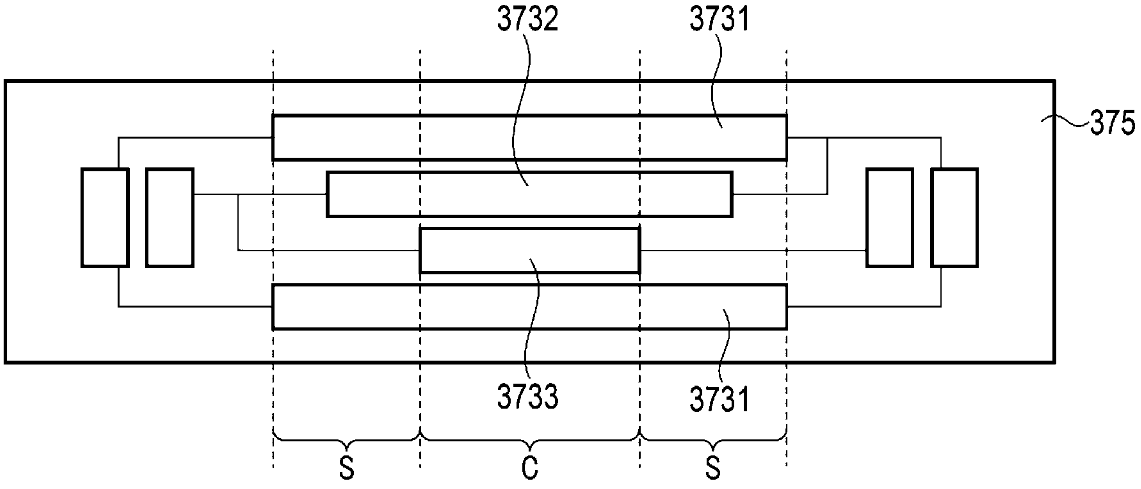
FIG. 17 is a diagram illustrating a configuration example of a heater unit in a fixer of a third configuration example.

FIG. 16 is a diagram illustrating a configuration example of the fixer 300, which is the third example of the fixer applicable to the image forming apparatus 1 according to the embodiment. In addition, FIG. 17 is a diagram illustrating a configuration example of a heater unit in the fixer 300.

As illustrated in FIG. 16, the fixer 300 includes a temperature sensor unit 74 (temperature sensors 741, 742), a tubular film 371 as a fixing member (fixing rotating body), a pressing roller 372, a heating element 373, and a heating element substrate 375. The pressing roller 372 forms a nip with the tubular film 371. The tubular film 371 and the pressing roller 372 heat and press the print medium P entering the nip.

The heater unit includes the heating element 373 and the heating element substrate 375. The heating element substrate 375 can be formed of a metal material, a ceramic material, or the like. The heating element substrate 375 is formed in an elongated rectangular plate shape. The heating element substrate 375 is disposed inside the tubular film 371. The longitudinal direction of the heating element substrate 375 is parallel to the axial direction of the tubular film 271.

The heating element 373 has a plurality of heating elements 3731, 3732, and 3733. The heating element 373 is provided so as to be in contact with the inner surface of the tubular film 371. Each of the heating elements 3731, 3732, and 3733 is a resistor that generates heat by being supplied with electric power from an AC power supply.

The heating element 3731 is used so that toner can be fixed on a print medium P that has the maximum processable width (sheet width) in the direction orthogonal to the conveyance direction. The heating element 3731 has a width corresponding to the maximum sheet width that can be used in the image forming apparatus 1. The heating element 3731 is disposed on the heating element substrate 375 on the upstream side and the downstream side in the conveyance direction of the print medium P.

The heating element 3732 is shorter than the heating element 3731 in the direction orthogonal to the conveyance direction of the print medium P. The heating element 3733 is even shorter than the heating element 3732 in the direction orthogonal to the conveyance direction of the print medium P. The heating element 3731 is a main or primary heater, and the heating elements 3732 and 3733 are secondary or sub-heaters. The ON/OFF of the main heater and the sub-heaters is controlled in accordance with the paper (sheet) width of the print medium P being printed.

The image forming apparatus 1 including the fixer 300 illustrated in FIGS. 16 and 17 is capable of performing failure prediction processing such as that already described above. However, the image forming apparatus 1 including the fixer 300 requires measurements of characteristics such as those illustrated in FIGS. 4 to 10 to perform the failure prediction processing described above.

Next, a fixer 400, which is the fourth example of the fixing device applicable to the image forming apparatus 1 according to an embodiment, will be described.

Figure 18:
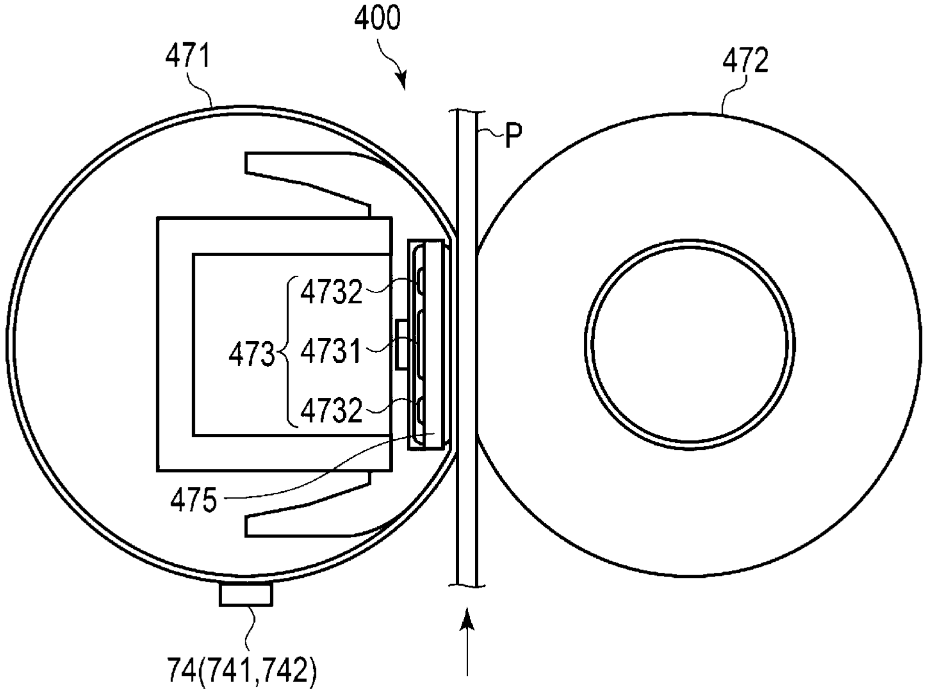
FIG. 18 is a diagram illustrating a fourth configuration example of a fixer.
Figure 19:
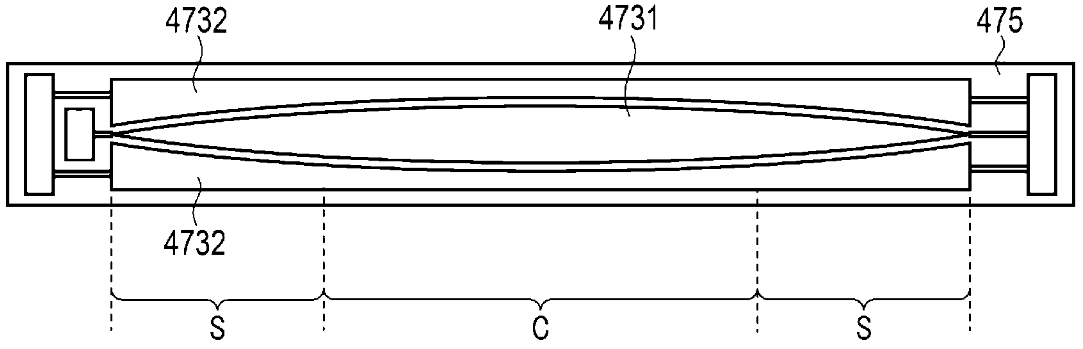
FIG. 19 is a diagram illustrating a configuration example of a heater unit in a fixer of a fourth configuration example.

FIG. 18 is a diagram illustrating a configuration example of the fixer 400. FIG. 19 is a diagram illustrating a configuration example of a heater unit in the fixer 400.

As illustrated in FIG. 18, the fixer 400 includes a temperature sensor unit 74 (temperature sensors 741, 742), a tubular film 471 as a fixing member (fixing rotating body), a pressing roller 472, a heating element 473, and a heating element substrate 475. The pressing roller 472 forms a nip with the tubular film 471. The tubular film 471 and the pressing roller 472 heat and press the print medium P entering the nip.

The heater unit includes the heating element 473, and the heating element substrate 475. The heating element substrate 475 is formed of a metal material, a ceramic material, or the like. The heating element substrate 475 is formed in an elongated rectangular plate shape. The heating element substrate 475 is disposed inside the tubular film 471. The longitudinal direction of the heating element substrate 475 is parallel to the axial direction of the tubular film 471.

The heating element 473 includes heating elements 4731 and 4732. The heating element 473 is provided so as to be in contact with the inner surface of the tubular film 471. Each of the heating elements 4731 and 4732 is, for example, a resistor that generates heat by being supplied with electric power from an AC power supply.

The heating element 4731 has a width corresponding to the maximum width of the print medium P in the direction orthogonal to the conveyance direction. As illustrated in FIG. 19, the width of the heating element 4731 in the conveyance direction is large in the middle portion and gets smaller at the ends. The heating element 4731 is a main heater configured to intensively heat the center region C. For the heating element 4732, the width in the conveyance direction is small in the middle portion and larger at the ends. The heating element 4732 is a sub-heater configured to intensively heat the side regions S. The ON/OFF of the main heater and the sub-heater is controlled in accordance with the paper (sheet) width of the print medium P being printed.

The image forming apparatus including the fixer 400 illustrated in FIGS. 16 and 17 is capable of performing failure prediction processing such as that described above. However, the image forming apparatus 1 including the fixer 400 requires measurements of characteristics such as those illustrated in FIGS. 4 to 10 to perform the failure prediction processing.

Figure 20:
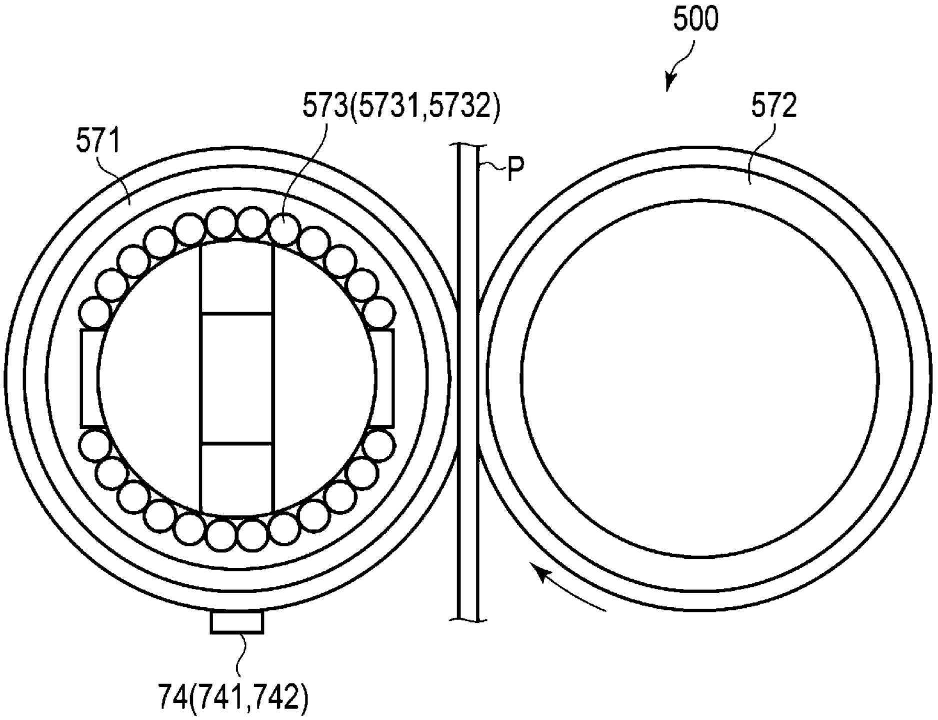
FIG. 20 is a diagram illustrating a fifth configuration example of a fixer.
Figure 21:
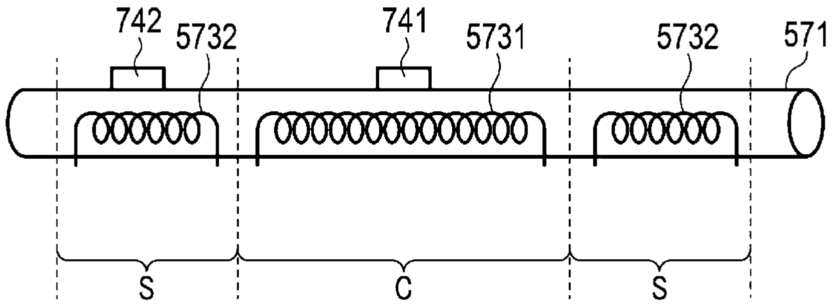
FIG. 21 is a diagram illustrating a configuration example of a heater unit in a fixer of a fifth configuration example.

FIG. 20 is a diagram illustrating a configuration example of a fixer 500, which is the fifth example of a fixing device applicable to an image forming apparatus 1 according to an embodiment. FIG. 21 is a diagram illustrating a configuration example of a heater unit in the fixer 500.

As illustrated in FIG. 20, the fixer 500 has a temperature sensor unit 74 (temperature sensors 741, 742), a heat roller 571 as a fixing member, a pressing roller 572, and an induction heating coil 573. The pressing roller 572 forms a nip with the heat roller 571. The heat roller 571 and the pressing roller 572 heat and press the print medium P entering the nip. The induction heating coil 573 is an example of a heat source that heats the heat roller 571. The induction heating coil 573 has a middle coil 5731 and end coils 5732. The middle coil 5731 and the end coils 5732 are disposed in the heat roller 571 side by side along the direction orthogonal to the paper conveyance direction. The middle coil 5731 is disposed such that the middle position in the width direction (direction orthogonal to the conveyance direction) of the print medium P passing through the nip will be aligned. The end coils 5732 are disposed on both sides of the middle coil 5731.

The middle coil 5731 is an example of a first heat source. As illustrated in FIG. 21, the middle coil 5731 heats the center region C of the heat roller 571. The end coil 5732 is an example of a second heat source. As illustrated in FIG. 21, each end coil 5732 heats a side region S of the heat roller 571.

As in the case of the fixer 21 of the first configuration example, the temperature sensors 741 and 742 are contact-type temperature sensing devices such as thermistors. The temperature sensor 741 senses the temperature of the center region C of the heat roller 571. The temperature sensor 742 senses the temperature of a side region C of the heat roller 571.

The image forming apparatus 1 including the fixer 500 illustrated in FIGS. 20 and 21 is capable of performing failure prediction processing such as that described above. However, characteristics such as those illustrated in FIGS. 4 to 10 must be measured for the image forming apparatus 1 including the fixer 500.

It should be noted that certain functions described in each of the above embodiments as being implemented using hardware may also or instead be implemented by using software. In addition, functions may be implemented combining software or hardware as appropriate.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A fixing device, comprising:

a fixing member having a surface that contacts a sheet;

a temperature sensor unit configured to measure a temperature of the surface of the fixing member;

a heater unit configured to heat the fixing member when turned ON; and a controller configured to output a notification indicating an abnormality in the temperature measurement by the temperature sensor unit if an ON time of the heater unit during an operation period for controlling the fixing member to be at a target temperature, as measured by the temperature sensor unit, is longer than a predetermined threshold time, wherein the heater unit includes a first heat source positioned to heat a first region of the fixing member and a second heat source positioned to heat a second region of the fixing member, and the controller is configured to output a notification of an abnormality of the temperature measurement by the temperature sensor unit if a time difference between ON time of the first heat source and ON time of the second heat source during a predetermined length of time in the operation period is greater than a threshold value.

2. The fixing device according to claim 1, wherein the temperature sensor unit includes a first temperature sensor measuring a temperature of the first region of the fixing member and a second temperature sensor measuring a temperature of the second region of the fixing member, and the controller is configured to output a notification indicating an abnormality of the temperature measurement by the first temperature sensor or the second temperature sensor based on the time difference between the ON time of the first heat source of the heater unit for heating the first region and the ON time of the second heat source of the heater unit for heating the second region during the predetermined length of time in the operation period.

3. The fixing device according to claim 1, wherein the temperature sensor unit includes a first temperature sensor measuring a temperature of the first region of the fixing member and a second temperature sensor measuring a temperature of the second region of the fixing member, the controller is configured to identify a temperature difference between the temperature measurement by the first temperature sensor and an actual temperature of the first region or a temperature difference between the temperature measurement by the second temperature sensor and an actual temperature of the second region based on the time difference between the ON time of the first heat source and the ON time of the second heat source during the predetermined length of time in the operation period.

4. The fixing device according to claim 3, wherein the controller identifies the temperature difference between the temperature measurement by the first temperature sensor and the actual temperature of the first region or the temperature difference between the temperature measurement by the second temperature sensor and the actual temperature of the second region by table lookup using the time difference between the ON time of the first heat source and the ON time of the second heat source during the predetermined length of time in the operation period as an index value.

5. The fixing device according to claim 3, wherein the controller is further configured to output information indicating the identified temperature difference between the temperature measurement by the first temperature sensor and the actual temperature of the first region or the identified temperature difference between the temperature measurement by the second temperature sensor and the actual temperature of the second region.

6. The fixing device according to claim 3, wherein the controller is further configured to update a high-temperature stop temperature setpoint value for the first region in accordance with the identified temperature difference between the temperature sensed by the first temperature sensor and the actual temperature of the first region and a high-temperature stop temperature setpoint value for the second region in accordance with the identified temperature difference between the temperature sensed by the second temperature sensor and the actual temperature of the second region.

7. The fixing device according to claim 1, wherein the controller outputs the notification indicating the abnormality of the temperature measurement by the temperature sensor unit to a display.

8. The fixing device according to claim 1, wherein the controller outputs the notification indicating the abnormality of the temperature measurement by the temperature sensor unit to an external device via a communication interface.

9. The fixing device according to claim 1, wherein the operation period is a warm-up period for bringing the fixing member to the target temperature.

10. The fixing device according to claim 1, wherein the operation period is ready standby period for maintaining the fixing member at the target temperature.

11. A fixing device, comprising:

a fixing member having a surface that contacts a sheet;

a first temperature sensor configured to measure a temperature of a first region of the surface of the fixing member;

a second temperature sensor configured to measure a temperature of a second region of the surface of the fixing member;

a first heater element positioned to heat the first region when turned ON;

a second heater element positioned to heat the second region when turned ON; and a controller configured to:

determine a cumulative ON time for the first heater element and a cumulative ON for the second heater element during an operation period for controlling the first and second regions to be at a target temperature, as respectively measured by the first and second temperature sensors, and detect an abnormality in the temperature measurement by the first temperature sensor or second temperature sensor based on a difference between the cumulative ON time for first heater element and the cumulative ON for the second heater element during the operation period.

12. The fixing device according to claim 11, wherein the controller is further configured to:

output a notification indicating the abnormality in the temperature measurement by the first temperature sensor or second temperature sensor.

13. The fixing device according to claim 12, wherein the notification includes a value for an offset between an estimated actual temperature for the first or second region and the temperature measured by the respective first or second temperature sensor.

14. The fixing device according to claim 13, wherein the controller determines the value of the offset based on the difference between the cumulative ON time for first heater element and the cumulative ON for the second heater element during the operation period.

15. An image forming apparatus, comprising:

an image forming unit configured to form a toner image on a sheet;

a fixing device configured to fix the toner image to the sheet with heat and pressure, the fixing device including:

a fixing member having a surface that contacts the sheet;

a temperature sensor unit configured to measure a temperature of the surface of the fixing member, and a heater unit configured to heat the fixing member when turned ON; and a controller configured to output a notification indicating an abnormality in the temperature measurement by the temperature sensor unit if an ON time of the heater unit during an operation period for controlling the fixing member to be at a target temperature, as measured by the temperature sensor unit, is longer than a predetermined threshold time, wherein the temperature sensor unit includes a first temperature sensor measuring a temperature of a first region of the fixing member and a second temperature sensor measuring a temperature of a second region of the fixing member, and the controller is configured to output a notification indicating an abnormality of the temperature measurement by the first temperature sensor or the second temperature sensor based on a time difference between the ON time of a first heat source of the heater unit for heating the first region and the ON time of a second heat source of the heater unit for heating the second region during a predetermined length of time in the operation period.

16. The image forming apparatus according to claim 15, wherein the controller is configured to output a notification of an abnormality of the temperature measurement by the temperature sensor unit if a time difference between ON time of the first heat source and ON time of the second heat source during the predetermined length of time in the operation period is greater than a threshold value.

17. The image forming apparatus according to claim 15, wherein the controller is configured to identify a temperature difference between the temperature measurement by the first temperature sensor and an actual temperature of the first region or a temperature difference between the temperature measurement by the second temperature sensor and an actual temperature of the second region based on a time difference between an ON time of the first heat source and an ON time of the second heat source during the predetermined length of time in the operation period.

18. The image forming apparatus according to claim 17, wherein the controller is further configured to update a high-temperature stop temperature setpoint value for the first region in accordance with the identified temperature difference between the temperature sensed by the first temperature sensor and the actual temperature of the first region and a high-temperature stop temperature setpoint value for the second region in accordance with the identified temperature difference between the temperature sensed by the second temperature sensor and the actual temperature of the second region.

* * * * *